(12) United States Patent
Suzuki et al.

(10) Patent No.: US 10,333,440 B2
(45) Date of Patent: Jun. 25, 2019

(54) MOTOR CONTROL APPARATUS AND ELECTRIC POWER STEERING SYSTEM

(71) Applicant: DENSO CORPORATION, Kariya, Aichi-pref. (JP)

(72) Inventors: Haruo Suzuki, Kariya (JP); Akira Takesaki, Kariya (JP); Hiroyasu Otake, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 2 days.

(21) Appl. No.: 15/833,818

(22) Filed: Dec. 6, 2017

(65) Prior Publication Data

US 2018/0167004 A1 Jun. 14, 2018

(30) Foreign Application Priority Data

Dec. 8, 2016 (JP) .................. 2016-238457

(51) Int. Cl.
*H02P 6/00* (2016.01)
*H02P 6/08* (2016.01)
(Continued)

(52) U.S. Cl.
CPC .............. *H02P 6/28* (2016.02); *B62D 5/0463* (2013.01); *B62D 5/0469* (2013.01); *B62D 6/02* (2013.01); *B62D 6/10* (2013.01); *H02P 6/00* (2013.01); *H02P 6/06* (2013.01); *H02P 6/08* (2013.01); *H02P 6/17* (2016.02); *H02P 6/21* (2016.02); *H02P 21/05* (2013.01); *H02P 21/06* (2013.01); *H02P 21/22* (2016.02); *B62D 5/0409* (2013.01)

(58) Field of Classification Search
CPC ...................................................... H02P 6/00
See application file for complete search history.

(56) References Cited

U.S. PATENT DOCUMENTS 4,125,796 A * 11/1978 Nagase .................. H02P 25/03
318/400.23
5,281,774 A * 1/1994 Masaki ...................... B66B 1/24
187/253
(Continued)

FOREIGN PATENT DOCUMENTS

JP 2008-137486 6/2008

*Primary Examiner* — Bentsu Ro
(74) *Attorney, Agent, or Firm* — Knobbe, Martens, Olson & Bear, LLP

(57) ABSTRACT

In an apparatus, an execution determiner determines, for each of sequential first and second motor control cycles, whether to execute a voltage correction task for a voltage command, and obtains, for each of the first and second motor control cycles, a voltage correction as a function of a fundamental voltage correction and the determination result. A voltage corrector corrects, for each of the first and second motor control cycles, the voltage command based on the voltage correction. A correction voltage feedback unit feeds back a value of the voltage correction calculated at the first motor control cycle to a voltage command calculator. The voltage command calculator calculates a value of the voltage command for the second motor control cycle based on the value of the voltage correction fed back from the correction voltage feedback unit in addition to a value of the motor current parameter and a predetermined current command.

16 Claims, 13 Drawing Sheets

(51) Int. Cl.
   *H02P 6/28*    (2016.01)
   *H02P 6/17*    (2016.01)
   *B62D 5/04*    (2006.01)
   *B62D 6/10*    (2006.01)
   *H02P 21/22*   (2016.01)
   *B62D 6/02*    (2006.01)
   *H02P 6/06*    (2006.01)
   *H02P 6/21*    (2016.01)
   *H02P 21/05*   (2006.01)
   *H02P 21/06*   (2016.01)

(56) References Cited

U.S. PATENT DOCUMENTS

| | | | | |
|---|---|---|---|---|
| 5,677,611 | A | * | 10/1997 | Yoshihara ............ B60L 3/0023 318/139 |
| 5,945,644 | A | * | 8/1999 | Jang .................... B66B 5/02 187/293 |
| 7,042,194 | B1 | * | 5/2006 | Kuroiwa ................ H02P 6/00 318/722 |
| 2006/0049784 | A1 | | 3/2006 | Suzuki |
| 2006/0061310 | A1 | | 3/2006 | Takai et al. |
| 2008/0315802 | A1 | * | 12/2008 | Ueda ..................... B66B 1/308 318/3 |

\* cited by examiner

ω

TIME q-AXIS CURRENT

Iq

Iq*

TIME

CORRECTION
EXECUTION GAIN G

TIME $Vq^{**}$ x1

TIME

MOTOR CONTROL APPARATUS AND ELECTRIC POWER STEERING SYSTEM

CROSS REFERENCE TO RELATED APPLICATIONS

This application is based on and claims the benefit of priority from Japanese Patent Application 2016-238457 filed on Dec. 8, 2016, the disclosure of which is incorporated in its entirety herein by reference.

TECHNICAL FIELD

The present disclosure relates to motor control apparatuses and electric power steering systems each equipped with such a motor control apparatus.

BACKGROUND

Apparatuses for controlling a motor installed in an electric power steering system cause the motor to generate assist torque to be applied to a steering wheel via a steering mechanism, thus assisting the driver's steering operation of a steering wheel.

For example, Japanese Patent Application Publication No. 2008-137486, which will be referred to as a published patent document, discloses a control apparatus for an electric power steering system. The control apparatus determines a commanded current in accordance with an actual value of a current that flows through a motor and is measured by a current sensor. Then, the control apparatus supplies the commanded current to the motor to thereby adjust the assist torque to be applied to the steering wheel via a steering mechanism.

The control apparatus specially determines whether the steering wheel has reached an upper limit, i.e. a steering end, at which sudden stop of the motor may occur. The situation where the steering wheel reaches the upper limit will also be referred to as the steering limit situation.

Upon determining that the steering wheel reaches the upper limit, the control apparatus holds a value of the commanded current to the actual current value measured by the current sensor immediately before the occurrence of the steering limit situation. This limits the value of the commanded current to be lower than an actual value, i.e. an upper limit value, measured at the occurrence of the steering limit situation. This results in reduction of an impact applied to the steering mechanism due to the sudden stop of the motor.

SUMMARY

Unfortunately, the control apparatus disclosed in the published patent document cannot limit the value of the commanded current to be lower than the upper limit value if the actual current value measured by the current sensor immediately before the occurrence of the steering limit situation has already reached the upper limit value. The control apparatus disclosed in the published patent document also cannot limit the value of the commanded current to be lower than the upper limit value if the value of the commanded value is equal to the actual current value measured by the current sensor immediately before the occurrence of the steering limit situation. These cases may not limit the variations in an actual current supplied to the motor due to sudden stop of the motor, resulting in difficulty in reduction of an impact applied to the steering mechanism due to the sudden stop of the motor.

Additionally, the control apparatus disclosed in the published patent document limits the value of the commanded current only after the occurrence of the steering limit situation. This will achieve insufficient effect of reducing an impact applied to the steering mechanism due to sudden stop of the motor.

In view of these circumstances, an exemplary aspect of the present disclosure seeks to provide motor control apparatuses, each of which is capable of limiting variations of an actual current supplied to a motor due to sudden change of the rotational speed of the motor.

According to a first exemplary aspect of the present disclosure, there is provided an apparatus for controlling a motor including at least one coil. The apparatus includes a power converter including at least one switching element and configured to convert input power to output power via the at least one switching element, and apply the output power to the motor. The apparatus includes a motor current detector configured to detect a value of a motor current parameter associated with a current flowing in the at least one coil of the motor, and a rotational angle measuring unit configured to measure a rotational angle of the motor. The apparatus includes a controller configured to control switching operations of the at least one switching element to thereby control drive of the motor. The controller includes a voltage command calculator configured to calculate, based on the value of the motor current parameter and a predetermined current command, a voltage command for the motor for each of sequential first and second motor control cycles. The controller includes a fundamental voltage command calculator configured to calculate, based on an angular acceleration of the motor associated with the rotational angle of the motor, a fundamental voltage correction for the voltage command for each of the first and second motor control cycles, and an execution determiner. The execution determiner is configured to determine, for each of the first and second motor control cycles, whether to execute a voltage correction task for the voltage command, and obtain, for each of the first and second motor control cycles, a voltage correction as a function of (1) The fundamental voltage correction
(2) A result of the determination of whether to execute the voltage correction task for the voltage command.

The controller includes a voltage corrector configured to correct, for each of the first and second motor control cycles, the voltage command based on the voltage correction. The controller includes a correction voltage feedback unit configured to feed back a value of the voltage correction calculated at the first motor control cycle to the voltage command calculator. The voltage command calculator is configured to calculate a value of the voltage command for the second motor control cycle based on the value of the voltage correction fed back from the correction voltage feedback unit in addition to the value of the motor current parameter and the predetermined current command.

According to a second exemplary aspect of the present disclosure, there is provided an electric power steering system. The electric power steering system includes a motor configured to output assist torque for assisting a driver's turning operation of a steering member of a vehicle, and an apparatus for controlling the motor according to the first exemplary aspect. The electric power steering system includes a transfer mechanism configured to transfer the assist torque to a target member linked to the steering member.

This configuration of each of the first and second exemplary aspects calculates the voltage correction as a function of the angular acceleration of the motor, and corrects the voltage command based on the voltage correction. This configuration therefore reduces variations in the current flowing in the at least one coil of the motor even if the rotational state of the motor is suddenly changed.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
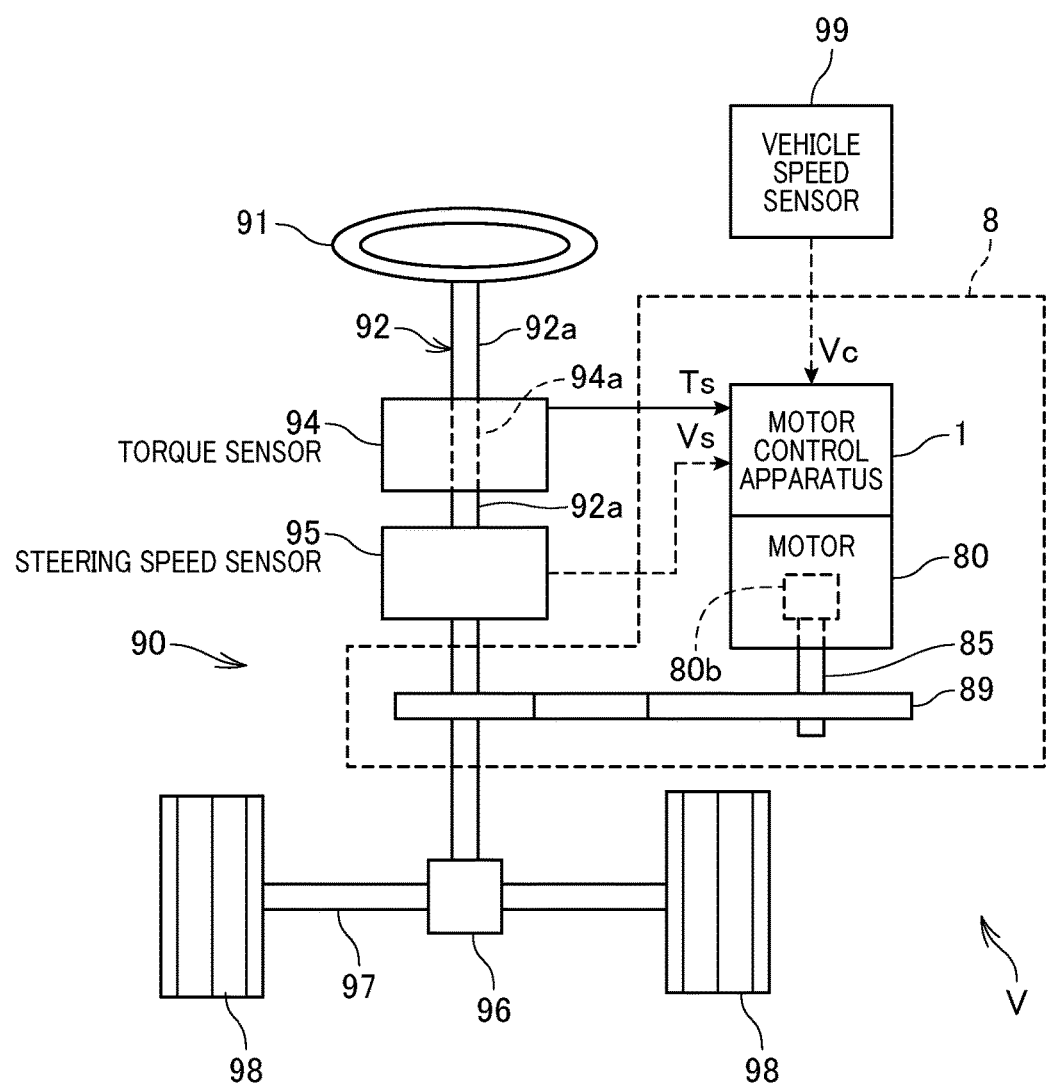
FIG. 1 is a structural diagram schematically illustrating an electric power steering system according to the first embodiment of the present disclosure.

The following describes embodiments of the present disclosure with reference to the accompanying drawings. In the embodiments, like parts between the embodiments, to which like reference characters are assigned, are omitted or simplified to avoid redundant description. In particular, a reference numeral X, such as 31, and a reference numeral Y, which is the sum of the reference numeral X and a hundreds place digit, such as 131, show identical or similar elements.

First Embodiment

First, the following describes the first embodiment of the present disclosure with reference to FIGS. 1 to 10.

FIG. 1 illustrates an electric power steering system 8, to which a motor control apparatus 1 and a motor 80 are applied.

Referring to FIG. 1, the electric power steering system 8 is installed in, for example, a steering system 90; the steering system 90 is installed in the vehicle V. The electric power steering system 8 is operative to assist a driver's steering operation of a steering wheel 91 of the vehicle V.

The steering system 90 includes, for example, the steering wheel 91 as a driver's operation member, a steering shaft 92, a torque sensor 94, a steering speed sensor 95, a pinion gear 96, a rack and axle 97, wheels 98, a vehicle speed sensor 99, and the electric power steering system 8.

The steering shaft 92 is comprised of, for example, a first portion, i.e. an upper portion, 92a and a second portion, i.e. a lower portion, 92b. Each of the first and second portions 92a and 92b of the steering shaft 92 also has opposing first and second ends.

The steering wheel 91 is connected to the first end of the first portion 92a of the steering shaft 92. The torque sensor 94 and the steering speed sensor 95 are mounted to the steering shaft 92. The torque sensor 94 is operative to measure torque based on a driver's steering operation of the steering shaft 92 as steering torque Ts, and output a measurement signal indicative of the measured steering torque Ts to the motor control apparatus 1.

For example, the torque sensor 94 includes a torsion bar 94a having opposing first and second ends. The second end of the first portion 92a of the steering shaft 92 is coaxially connected to the first end of the torsion bar 94a, and the second end of the torsion bar 94a is coaxially connected to the first end of the second portion 92b of the steering shaft 92.

The steering speed sensor 95 is operative to measure a steering speed Vs based on a driver's steering operation of the steering shaft 92, and output a measurement signal indicative of the measured steering speed Vs to the motor control apparatus 1.

The pinion gear 96 is mounted to the second end of the second portion 92b of the steering shaft 92.

The rack and axle 97 includes a rod-shaped rack with which the pinion gear 96 is engaged. The rack and axle 97 also includes tie rods each having opposing first and second ends. The first end of each of the tie rods is coupled to a corresponding one of both ends of the rod-shaped rack. One of the wheels 98 is mounted to the second end of a corresponding one of the tie rods, and the other of the wheels 98 is also mounted to the second end of a corresponding one of the tie rods.

Driver's turning of the steering wheel 91 causes the steering shaft 92 coupled to the steering wheel 91 to turn. This rotary motion, i.e. torque, of the steering shaft 92 is transformed to linear motion of the rack of the rack and axle 97. This linear motion of the rack of the rack and axle 97 causes the wheels 98 to steer via the respective tie rods. The steering angle of each of the wheels 98 is determined based on the axial displacement of the rack of the rack and axle 97.

The vehicle speed sensor 99 is capable of measuring a speed of the vehicle 50 based on, for example, the rotational speed of a transmission installed in the vehicle 50; the speed of the vehicle 50 will be referred to as a vehicle speed Vc [km/h]. Then, the vehicle speed sensor 99 is capable of outputting a measurement signal indicative of the measured vehicle speed Vc to the motor control apparatus 1.

For example, the vehicle speed sensor 99 includes a rotating member to which a plurality of magnetic poles are mounted; the rotating member is configured to be rotated together with the transmission. The vehicle speed sensor 99 also includes a magnet resistive sensor that converts the change of magnetic flux generated based on rotation of the rotating member, i.e. rotation of the magnetic poles, into the change of an electrical resistance. Then, the vehicle speed sensor 99 calculates, based on the change of the electrical resistance, the vehicle speed Vc.

Figure 2:
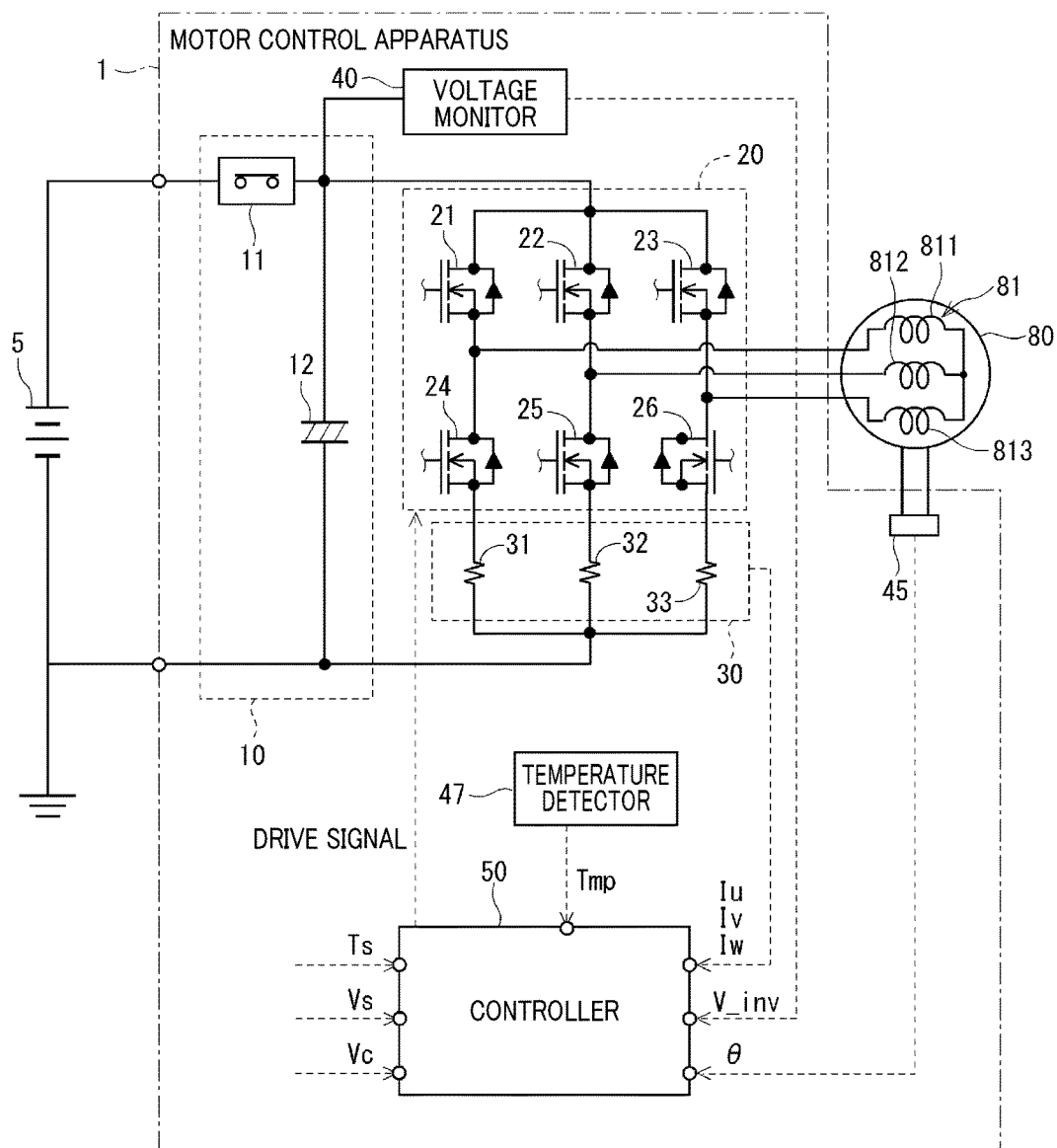
FIG. 2 is a circuit diagram schematically illustrating an example of the overall circuit structure of a motor control apparatus illustrated in FIG. 1.

Referring to FIGS. 1 and 2, the electric power steering system 8 includes, for example, a battery 5, a motor 80 with a shaft 85, and a deceleration gear mechanism 89 serving as, for example, a power transfer mechanism. In FIG. 2, the shaft 85, the deceleration gear mechanism 89 and torque sensor 94 are omitted from illustration.

The deceleration gear mechanism 89 includes, for example, a first gear coupled to the shaft 85 of the motor 80, and a second gear engaged with the first gear and mounted to the steering shaft 92. For example, the deceleration gear mechanism 89 is operative to transfer assist torque generated based on the turning of the shaft 85 of the motor 80 to the steering shaft 92 while decelerating the rotational speed of the motor 80, i.e. increasing the assist torque generated by the motor 80 by a predetermined gear ratio between the first gear and the second gear.

As described above, the electric power steering system 8 according to the first embodiment is designed as a shaft assist system for assisting the turning of the steering shaft 92, which is a drive target, based on the assist torque generated by the motor 80. As a modification, the electric power steering system 8 according to the first embodiment can be designed as a rack assist system for assisting the axial displacement of the rack of the rack and axle 97, which is a drive target, based on the assist torque generated by the motor 80. As another modification, the electric power steering system 8 according to the first embodiment can be designed as a rack assist system for assisting the turning of the pinion gear 96, which is a drive target, based on the assist torque generated by the motor 80.

The motor 80 is driven based on power supplied from the battery 5, which serves as a power supply, to generate assist torque that turns the first gear of the deceleration gear mechanism 89 in a predetermined forward direction or a predetermined reverse direction opposite to the forward direction.

Referring to FIGS. 1 and 2, the motor 80 is designed as, for example, a three-phase brushless motor comprised of, for example, a stator 80a, a rotor 80b, the shaft 85, and an unillustrated magnetic field member, such as permanent magnets, a field coil, and the like. The stator 80a includes, for example, an unillustrated stator core, and a coil assembly 81 including three-phase coils, i.e. U, V, and W-phase coils, 811, 812, and 813. The rotor 80b, to which the shaft 85 is mounted, is configured to be rotatable relative to the stator core together with the shaft 85. The three-phase coils 811, 812, and 813 are wound in, for example, slots of the stator core and around the stator core. The magnetic field member is mounted to the rotor 80b for generating a magnetic field. That is, the motor 80 is capable of rotating the rotor 80b based on magnetic interactions between the magnetic field generated by the magnetic field member of the rotor 80b and a rotating magnetic field generated by the three-phase coils 811, 812, and 813.

The rotor 80b has a direct axis (d-axis) in line with a direction of magnetic flux created by the magnetic field member. The rotor 80b also has a quadrature axis (q-axis) with a phase being π/2-radian electrical angle leading with respect to a corresponding d-axis during rotation of the rotor. In other words, the q-axis is electromagnetically perpendicular to the d-axis. The d and q axes constitute a d-q coordinate system, i.e. a two-phase rotating coordinate system, defined relative to the rotor 80b.

Note that currents flowing through the respective U, V, and W-phase coils 811, 812, and 813 will be referred to as motor currents or U-, V-, and W-phase currents Iu, Iv, and Iw.

The shaft 85 has opposing first and second ends in its axial direction. For example, the first end of the shaft 85 is located to face the motor control apparatus 1. The second end of the shaft 85 serves as an output terminal coupled to the deceleration gear 89 (see FIG. 1). This enables torque generated based on rotation of the rotor assembly, which is comprised of the rotor 80b and the shaft 85, to be transferred to the steering shaft 92 via the deceleration gear 89.

As illustrated in FIG. 2, the motor control apparatus 1 installed in the electric power steering system 8 is connected to a battery 5 via, for example, a harness including positive and negative power supply lines PL1 and PL2. That is, the positive power supply line PL1 is connected to the positive terminal of the battery 5, and the negative power supply line PL2 is connected to the negative terminal of the battery 5. The negative power supply line PL2 serves as a common signal ground of the motor control apparatus 1.

The motor control apparatus 1 includes a power-supply input circuit 10, an inverter 20, a current measuring unit 30, a voltage monitor 40, a rotational angle sensor 45, a temperature detector 47, and a controller 50.

The power-supply input circuit 10 is provided between the battery 5 and the inverter 20, which enables electrical power to be supplied therebetween.

Specifically, the power-supply input circuit 10 includes a power-supply shutoff unit 11 and a capacitor 12. The power-supply shutoff unit 11 is provided on the positive power supply line PL1 between the battery 5 and the inverter 20. The capacitor 12 is connected between the positive and negative power supply lines PL1 and PL2 in parallel to the battery 5.

The power-supply shutoff unit 11 is connected to the controller 50, and operative to shut off the power supply from the battery 5 to the inverter 20 when controlled by the controller 50 or enables the power supply from the battery 5 to the inverter 20 when controlled by the controller 50.

The capacitor 12 is operative to reduce normal mode noise from the battery 5 to the inverter 20, and smooth fluctuations of a DC voltage, i.e. a power supply voltage, across the battery 5.

The inverter 20, which is an example of a power converter for converging input power to output power, is connected to the battery 5 via the power supply lines PL1 and PL2. The inverter 20 is operative to receive DC power, i.e. the power supply voltage, supplied from the battery 5, and convert the DC power into alternating-current (AC) power, i.e. an alternating-current voltage. Then, the inverter 20 is operative to apply the AC power to the three-phase coils 811, 812, and 813.

The inverter 20 is comprised of six switching elements 21 to 26 connected in bridge configuration.

Specifically, the switching elements 21 and 24 are a pair of U-phase upper- and lower-arm switches connected in series to each other, and the switching elements 22 and 25 are a pair of V-phase upper- and lower-arm switches connected in series to each other. Additionally, the switching elements 23 and 26 are a pair of W-phase upper- and lower-arm switches connected in series to each other.

The switching elements 21 to 26 are for example semiconductor switches, such as metal-oxide-semiconductor field-effect transistors (MOSFETs). The preferred embodiment uses MOSFETs as the respective switching elements 21 to 26, but can use other types of switches, such as insulated-gate bipolar transistors (IGBTs) or thyristors, in place of the MOSFETs. That is, one or more of various types of switches, such as MOSFETs or IGBTs, can be used for each of switching elements 21 to 26.

If the MOSFETs are used as the switching elements 21 to 26, the intrinsic diode of each of the MOSFETs 21 to 26 can serve as a flywheel diode connected in antiparallel to the corresponding one of the MOSFETs 21 to 26. Other flywheel diodes can be connected in antiparallel to the respective switching elements 21 to 26.

In the first embodiment, MOSFETs are used as the switching elements 21 to 26 as illustrated in FIG. 2.

That is, the source of each of the upper-arm switching elements 21 to 23 is connected to the drain of the corresponding one of the lower-arm switching elements 24 to 26.

The drains of the switching elements 21 to 23 are commonly connected to the positive terminal of the battery 5 via the positive power supply line PL1.

The connection point between the U-phase upper- and lower-arm switching elements 21 and 24 is connected to a first end of the U-phase coil 811, and the connection point between the V-phase upper- and lower-arm switching elements 22 and 25 is connected to a first end of the V-phase coil 812. Additionally, the connection point between the W-phase upper- and lower-arm switching elements 23 and 26 is connected to a first end of the W-phase coil 813. Second ends of the U, V-, and W-phase coils 811, 812, and 813, which are opposite to the first ends, are connected to a common junction, i.e. a neutral point, in, for example, a star-configuration.

The current measuring unit 30 includes current sensor elements 31, 32, and 33.

The sources of the switching elements 24 to 26 are respectively connected to first ends of respective current sensor elements 31 to 33. Second ends of the current sensors 31 to 33, which are opposite to their first ends, are connected to the negative terminal of the battery 5 via the common signal ground PL2. For example, each of the current sensing elements 31 to 33 is comprised of a shunt resistor or a Hall integrated circuit (IC).

The current sensor element 31, which is referred to as a U-phase current sensor element 31, is operative to output, to the controller 50, a U-phase current parameter, which is a voltage thereacross, indicative of the U-phase current Iu flowing through the U-phase coil 811.

The current sensor element 32, which is referred to as a V-phase current sensor element 32, is operative to output, to the controller 50, a V-phase current parameter, which is a voltage thereacross, indicative of the V-phase current Iv flowing through the V-phase coil 812.

The current sensor element 33, which is referred to as a W-phase current sensor element 33, is operative to output, to the controller 50, a W-phase current parameter, which is a voltage thereacross, indicative of the W-phase current Iw flowing through the W-phase coil 813.

The voltage monitor 40 is connected to the positive power supply line PL1 between the power-supply shutoff unit 11 and the upper-arm switches 21 to 23. The voltage monitor 40 is operative to monitor a voltage from the battery 5 to the inverter 20 as an inverter voltage V_inv, and output the monitored inverter voltage V_inv to the controller 50.

The rotational angle sensor 45 includes, for example, a resolver, and is capable of measuring a rotational angle θ of the rotor 80b of the motor 80, which will be referred to as the rotational angle θ of the motor 80. Then, the rotational speed sensor 84 is capable of outputting a measurement signal indicative of the measured rotational angle θ of the motor 80 to the motor control apparatus 1. The rotational angle sensor 45 is also capable of measuring an angular velocity ω of the motor 80. Then, the rotational speed sensor 84 is capable of outputting a measurement signal indicative of the measured angular velocity ω of the motor 80, which will be referred to as a motor angular velocity ω, to the motor control apparatus 1.

The temperature detector 47 includes, for example, a thermistor, as an example of a temperature-sensitive element, such as a ceramic semiconductor, having a variable electrical resistance depending on temperature. The temperature detector 47 is operative to detect internal temperature of the motor control apparatus 1, such as ambient temperature around the inverter 20. For example, the temperature detector 47 can measure, as an internal temperature Tmp [° C.], the temperature of the atmosphere around the inverter 20. For example, the temperature sensor 47 is mounted to a heatsink of the inverter 20; the heatsink is operative to dissipate heat generated by the switching elements 21 to 26 from the switching elements 21 to 26. The temperature detector 47 can be mounted to another portion in the inverter 20 at which the temperature detector 47 can detect the internal temperature Tmp of the motor control apparatus 1.

The controller 50 is comprised mainly of a microcomputer including, for example, a CPU and a memory unit including a ROM and a RAM. The CPU of the controller 50 for example can run one or more programs, i.e. program instructions, stored in the memory unit, thus implementing various control tasks as software operations. As another example, the CPU of the controller 50 can include a specific hardware electronic circuit to implement the various control tasks as hardware operations.

Figure 3:
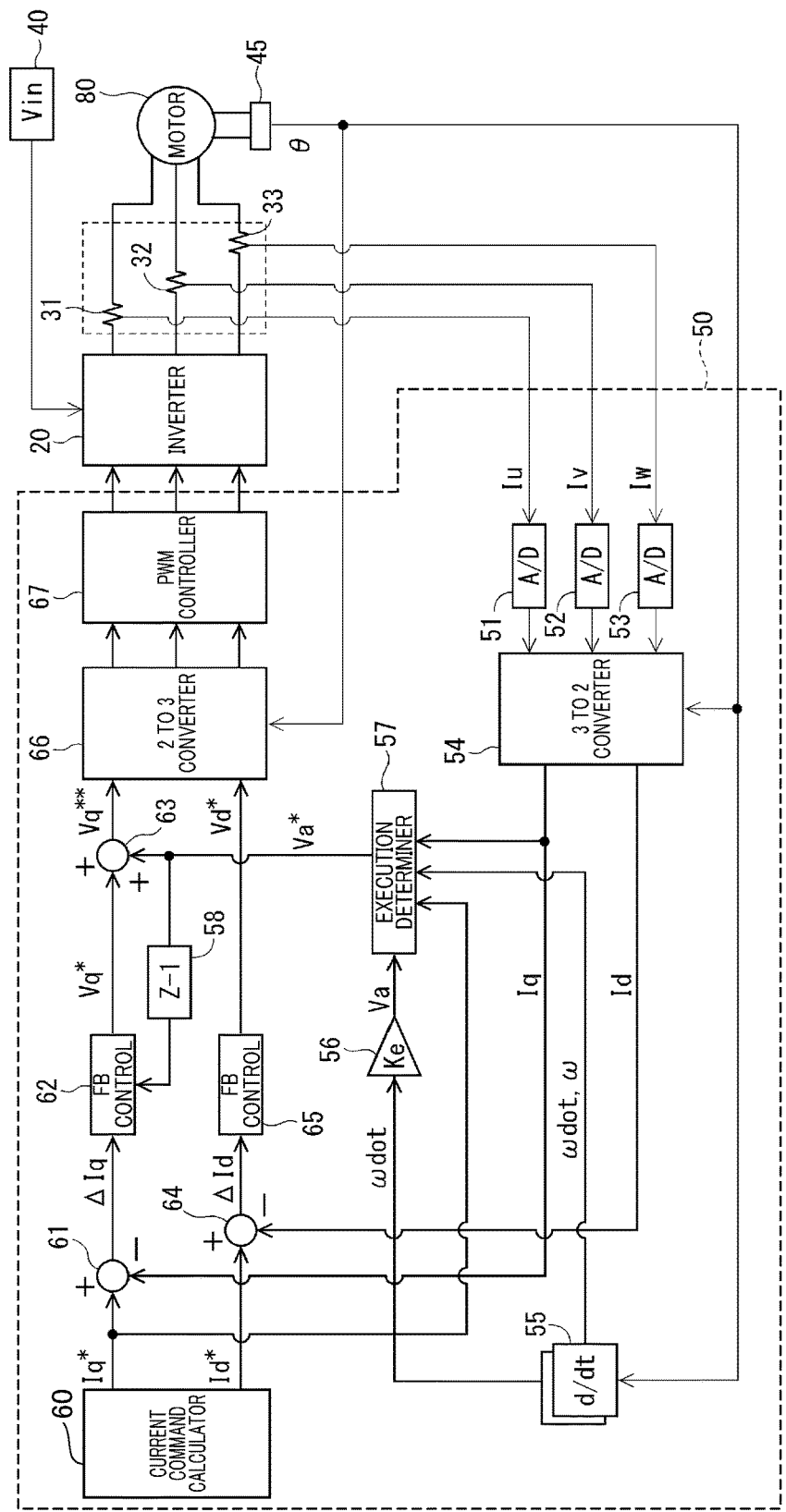
FIG. 3 is a block diagram schematically illustrating functional modules of a controller illustrated in FIG. 2.

Referring to FIGS. 2 and 3, the controller 50 is configured to receive the motor currents Iu, Iv, and Iw, the inverter voltage V_inv, the steering torque Ts, the steering speed Vs, the vehicle speed Vc, the rotational angle θ, and the internal temperature Tmp. Then, the controller 50 controls on-off switching operations of the respective switching elements 21 to 26 in accordance with the motor currents Iu, Iv, and Iw, the inverter voltage V_inv, the steering torque Ts, the steering speed Vs, the vehicle speed Vc, the rotational angle θ, and the internal temperature Tmp to correspondingly control how the motor 80 is driven.

In particular, the controller 50 performs a known pulse-width modulation (PWM) task that controls a duty of each of the switching elements 21 to 26 to correspondingly match the motor currents Iu, Iv, and Iw fed back thereto with three-phase command currents, which are described later. This PWM control generates drive signals for the respective switching elements 21 to 26. Each of the drive signals is configured to show an on command for changing the corresponding switching element from an off state to an on state, and an off command for changing the corresponding switching element from the on state to the off state. Each of the drive signals is, for example, designed as a pulse voltage signal with a controllable duty. The duty represents a controllable ratio, i.e. percentage, of an on-pulse width for each switching cycle. Note that the on command of the drive signal is expressed as a logical high-level (H) voltage signal, and the off command of the drive signal is expressed as a logical low-level (L) voltage signal.

The controller 50 applies the respective drive signals to the corresponding control terminals, i.e. gates, of the switching elements 21 to 26 via, for example, pre-drivers, thus controlling on-off switching operations of the switching elements 21 to 26.

In particular, the controller 50 is configured to complementarily turn on the upper- and lower-arm switching elements for each phase, so that the upper- and lower-arm switching elements for the corresponding phase are complementarily turned on.

Note that the controller 50 can perform a known pulse-amplitude modulation (PAM) task that controls the amplitude of a pulse voltage applied to each of the switching elements 21 to 26 to correspondingly match the motor currents Iu, Iv, and Iw fed back thereto with the three-phase command currents.

Next, the following describes how the controller 50 controls the inverter 20, and therefore the motor 80.

Referring to FIG. 3, the controller 50 includes analog-to-digital (A/D) converters 51 to 53, a three-phase to two-phase converter (3 TO 2 CONVERTER in FIG. 3) 54, a differential calculator 55, a fundamental voltage correction calculator 56, an execution determiner 57, and a previous voltage correction outputting unit 58. The controller 50 also includes a current command calculator 60, a q-axis subtractor 61, a q-axis feedback controller (FB CONTROL in FIG. 3) 62, a voltage corrector 63, a d-axis subtractor 64, a d-axis feedback controller (FB CONTROL in FIG. 3) 65, a two-phase to three-phase converter (2 TO 3 CONVERTER in FIG. 3) 66, and a PWM controller 67.

Note that the controller 50 repeatedly carries out a motor control cycle at predetermined intervals.

The respective A/D converters 51 to 53 are operative to sample the U-, V-, and W-phase current parameters from the respective current sensor elements 31, 32, and 33 in each motor control cycle, and calculates analog values of the three-phase currents Iu, Iv and Iw using the U-, V-, and W-phase current parameters in each motor control cycle. Then, the respective A/D converters 51 to 53 convert the analog values of the three-phase currents Iu, Iv and Iw into digital values of the three-phase currents Iu, Iv and wh in each motor control cycle, and output the digital values of the three-phase currents Iu, Iv and Iw to the three-phase to two-phase converter 54 in each motor control cycle.

The three-phase to two-phase converter 54 converts, in each motor control cycle, the digital values of the three-phase currents Iu, Iv and Iw, which will be respectively referred as three-phase current measurement values, into d- and q-axis current values Id and Iq using an electrical angle θe based on the rotational angle θ of the motor 80 and, for example, a known conversion function or a map. The d-axis current value represents a reactive current component, i.e. a flux current component, in the d axis, and the q-axis current value represents an active current component, i.e. a torque current component, contributing to generation of torque.

Thereafter, the three-phase to two-phase converter 54 feeds the d- and q-axis current values Id and Iq to the respective d- and q-axis subtractors 64 and 61 in each motor control cycle. The three-phase to two-phase converter 54 also feeds the q-axis current value Iq to the execution determiner 57 in each motor control cycle.

The differential calculator 55 differentiates the rotational angle θ of the motor 80 once to calculate the motor angular velocity ω in each motor control cycle. In addition, the differential calculator 55 differentiates the rotational angle θ of the motor 80 two times or differentiates the motor angular velocity ω once to calculate an angular acceleration ωdot of the motor 80, and outputs the motor angular acceleration ωdot to the fundamental voltage correction calculator 56 in each motor control cycle. The differential calculator 55 also outputs at least one of the motor angular velocity ω and the angular acceleration ωdot to the execution determiner 57 in each motor control cycle.

If the rotational angle sensor 45 calculate the motor angular velocity ω, the differential calculator 55 can differentiate the motor angular velocity ω once to calculate the motor angular acceleration ωdot.

The fundamental voltage correction calculator 56 calculates a fundamental voltage correction Vα as a function of the motor angular acceleration ωdot and the internal temperature Tmp in each motor control cycle, and outputs the fundamental voltage correction Vα to the execution determiner 57 in each motor control cycle. How to calculate the fundamental correction Vα will be described later.

The execution determiner 57 samples at least one of the motor angular velocity (and motor angular acceleration ωdot, the q-axis current value Iq, the fundamental voltage correction Vα, and a q-axis current command Iq* described later in each motor control cycle. Then, the execution determiner 57 determines, in each motor control cycle, whether to execute correction of a q-axis voltage command Vq*, which is described later, in accordance with (1) The at least one of the motor angular velocity ω and motor angular acceleration ωdot
(2) The q-axis current value Iq
(3) The q-axis current command Iq*

Hereinafter, the controller 50 according to the first embodiment is configured such that the motor angular acceleration ωdot is input from the differential calculator 55 to the execution determiner 57. How the execution determiner 57 determines whether to execute correction of the q-axis voltage command Vq* described later.

The previous voltage correction outputting unit 58 outputs, in each motor control cycle, a previous voltage correction Vα*(n−1) to the q-axis feedback controller 62; the previous voltage correction Vα*(n−1) has been a value of the voltage correction Vα* calculated by the execution determiner 57 at the previous motor control cycle, which is referred to as (n−1), relative to the corresponding present motor control cycle, which is refereed to as n. That is, the present value of the voltage correction Vα* calculated by the execution determiner 57 in each motor control cycle, i.e. the present control cycle n, is referred to simply as the voltage correction Vα*.

The current command calculator 60 calculates, in each motor control cycle, a d-axis current command Id* and the q-axis current command Iq* in the d-q coordinate system of the rotor 80b of the motor 80 in accordance with the steering torque Ts, the steering speed Vs, and the vehicle speed Vc. The d-axis current command Id* and q-axis current command Iq* represent target values of the three-phase currents Iu, Iv, and Iw obtained based on the steering torque Ts, the steering speed Vs, and the vehicle speed Vc.

For example, the current command calculator 60 has a map in data-table format, in mathematical expression format, and/or program format. The map includes information indicative of the relationship among 1. Values of each of the d-axis current command Id* and the q-axis current command Iq*,
2. Values of the steering torque Ts,
3. Values of the steering speed Vs,
4. Values of the vehicle speed Vc Specifically, the current command calculator 60 refers to the map, and extracts a value of each of the d-axis current command Id* and the q-axis current command Iq* corresponding to the input value of each of the steering torque Ts, the input value of the steering speed Vs, and the input value of the vehicle speed Vc.

Then, the current command calculator 64 outputs, in each motor control cycle, the q-axis current command Iq* to the q-axis subtractor 61 and the execution determiner 57, and outputs the d-axis current command Id* to the d-axis subtractor 64.

The q-axis subtractor 61 subtracts the q-axis current value Iq fed back from the three-phase to two-phase converter 54 from the q-axis current command Iq* to thereby calculate a q-axis current deviation ΔIq in each motor control cycle. Then, the q-axis subtractor 61 outputs the q-axis current deviation ΔIq to the q-axis feedback controller 62 in each motor control cycle.

The q-axis feedback controller 62 performs, for example, a proportional-integral (PI) feedback operation using the q-axis current deviation ΔIq, the previous voltage correction Vα*(n−1), and a previous q-axis voltage command Vq*(n−1) in each motor control cycle; the previous q-axis voltage command Vq*(n−1) was a value of the q-axis voltage command Vq* calculated by the q-axis feedback controller 62 at the previous motor control cycle (n−1). That is, the present value of the q-axis voltage command Vq* in each motor control cycle, i.e. the present control cycle n, is referred to simply as the q-axis voltage command Vq*.

Figure 4:
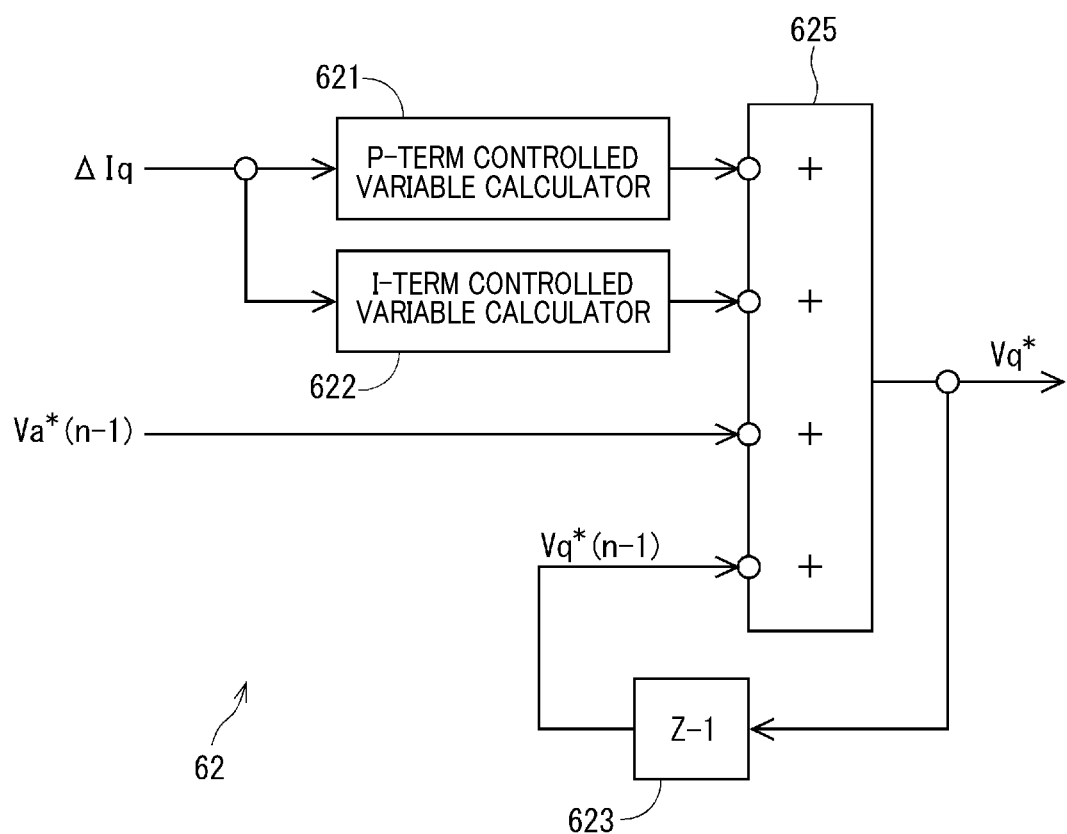
FIG. 4 is a block diagram schematically illustrating an example of the structure of a q-axis feedback controller illustrated in FIG. 3.

For example, as illustrated in FIG. 4, the q-axis feedback controller 62 includes a proportional-term controlled variable calculator 621, an integral-term controlled variable calculator 622, a previous voltage correction outputting unit 623, and an adder 625.

The proportional-term controlled variable calculator 621 performs a known proportional (P) operation using the q-axis deviation ΔIq as input data, and a proportional gain term, thus calculating a value of a proportional-term controlled variable Cp in each motor cycle. The integral-term controlled variable calculator 622 performs an integral (I) operation using the q-axis deviation ΔIq as input data, and an intentional gain term, thus calculating a value of an integral-term controlled variable Ci in each motor cycle.

The previous voltage correction outputting unit 623 outputs the previous q-axis voltage command Vq*(n−1) to the adder 625 in each motor cycle.

The adder 625 calculates the sum of the value of the proportional-term controlled variable Cp, the value of the integral-term controlled variable Ci in each motor cycle, the previous q-axis voltage command Vq*(n−1), and the previous voltage correction Vα*(n−1) to correspondingly calculate the q-axis voltage command Vq*.

The voltage corrector 63 corrects the q-axis voltage command Vq* in accordance with the voltage correction Vα* in each motor control cycle to thereby calculate a corrected q-axis voltage command Vq**. For example, the voltage corrector 63 according to the first embodiment adds the voltage correction Vα* to the q-axis voltage command Vq*, thus calculating the corrected q-axis voltage command Vq**.

The d-axis subtractor 64 subtracts the d-axis current value Id fed back from the three-phase to two-phase converter 54 from the d-axis current command Id* to thereby calculate a d-axis current deviation ΔId in each motor control cycle. Then, the d-axis subtractor 64 outputs the d-axis current deviation ΔId to the d-axis feedback controller 65 in each motor control cycle.

The d-axis feedback controller 65 performs, for example, a known proportional-integral (PI) feedback operation using the d-axis current deviation ΔId as input data, a proportional gain term, and an integral gain term in each motor cycle, thus calculating a d-axis voltage command Vd* in each motor control cycle.

The two-phase to three-phase converter 66 converts, in each motor control cycle, the d-axis voltage command Vd* and the corrected q-axis voltage command Vq** (or the q-axis voltage command Vq) into three-phase voltage commands Vu*, Vv*, and Vw* using the rotational angle θ and, for example, map data or equation data. The map data or equation data represents correlations between values of the d- and q-axis voltage commands Vd* and Vq*, values of the three-phase voltage commands Vu*, Vv*, and Vw*, and values of the motor rotational angle θ.

The PWM controller 67 calculates, in each motor control cycle, drive signals for the respective switching elements 21, 24, 22, 25, 23, and 26 in accordance with the three-phase sinusoidal voltage commands Vu*, Vv*, and Vw* using, for example, a cyclical (periodical) carrier signal, i.e. a cyclically triangular carrier signal. This generates, based on the comparison results, PWM pulse signals, i.e. switching signals; each of the PWM pulse signals includes a duty factor, i.e. a duty cycle, for each switching element 21 to 26 for each switching period. The duty factor for a switching element represents a controllable ratio, i.e. percentage, of an on duration of the switching element to a total duration of each switching period.

Thereafter, the PWM controller 67 applies the drive signals to the respective switching elements 21, 24, 22, 25, 23, and 26 to correspondingly perform on-off switching operations of the respective switching elements 21, 24, 22, 25, 23, and 26.

Figure 5:
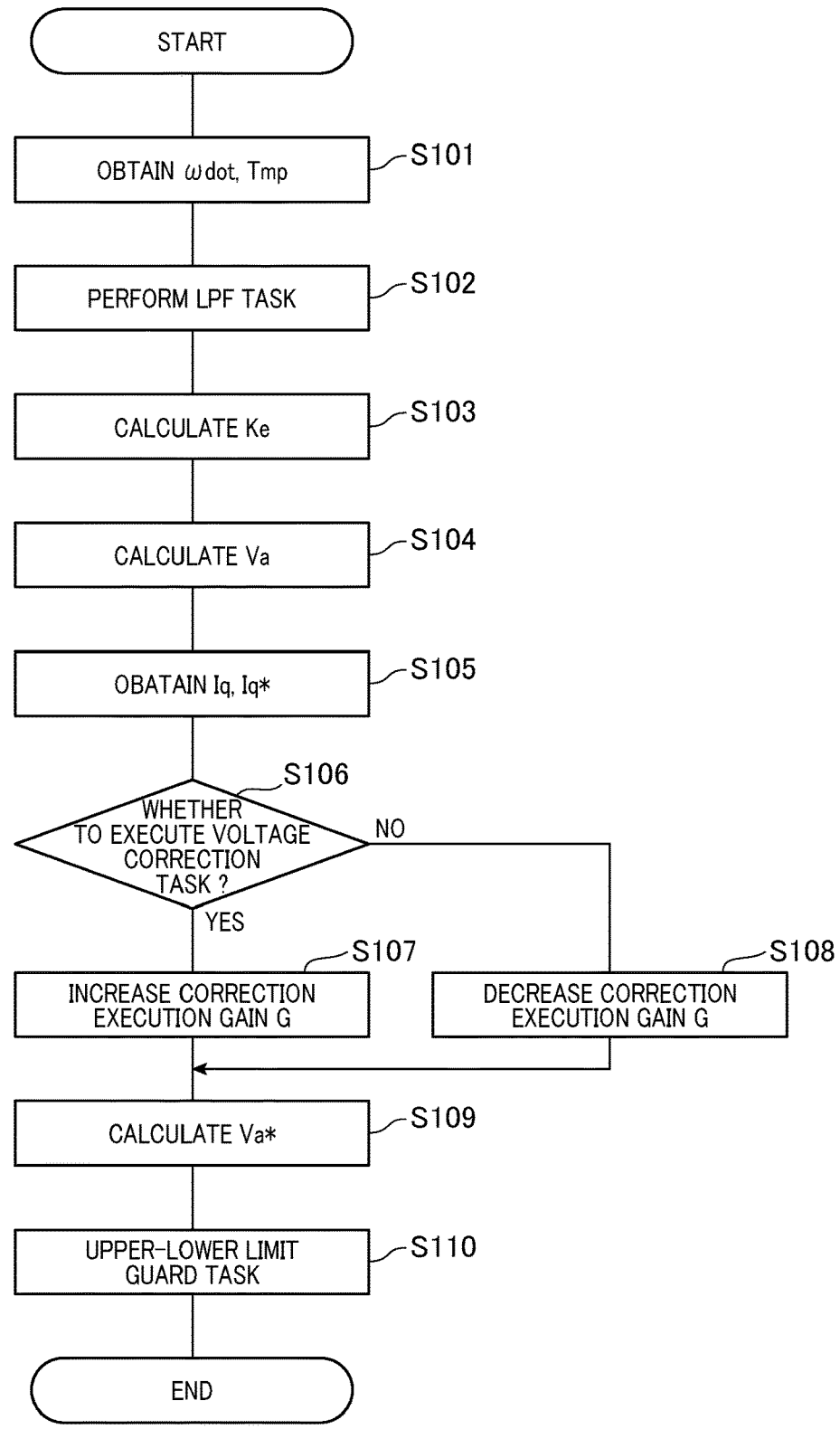
FIG. 5 is a flowchart schematically illustrating an example of a correction voltage calculation routine carried out by a controller illustrated in FIGS. 2 and 3.

Next, the following describes a correction voltage calculation routine carried out by the controller 50 in each motor control cycle with reference to FIG. 5.

In step S101, the fundamental voltage correction calculator 56 receives, in the corresponding present cycle, the motor angular acceleration ωdot and the internal temperature Tmp. Next, in step S102, the fundamental voltage correction calculator 56 performs, in the corresponding present cycle, a low-pass filtering (LPF) task that limits the frequency range of the motor angular acceleration ωdot to a predetermined narrow frequency range, thus generating a filtered motor angular acceleration ωdot_lpf. The low-pass filtering task can be carried out, by the execution determiner 57, for the voltage correction Vα* in step S109 described later, or can be carried out, by the fundamental voltage correction calculator 56, for the motor angular velocity ω in step S102 if the motor angular velocity ω is used in place of the motor angular acceleration ωdot.

Following the operation in step S102, the fundamental voltage correction calculator 56 calculates, in the corresponding present cycle, a conversion coefficient Ke as a function of the internal temperature Tmp using, for example, a map in data-table format, in mathematical expression format, and/or program format; the map includes information indicative of the relationship between values of the conversion coefficient Ke and values of the internal temperature Tmp. That is, the conversion coefficient Ke serves to convert the motor angular acceleration ωdot_lpf to a voltage change component based on the change in the motor angular velocity ω; the conversion coefficient Ke depends on the internal temperature Tmp.

Next, the fundamental voltage correction calculator 56 calculates, in the corresponding present cycle, the fundamental voltage correction Vα due to the change in the motor angular velocity ω in accordance with the following equation (1) in step S104:

$$Va = Ke \times \omega dot\_lpf \qquad (1)$$

Note that, because the motor angular acceleration ωdot_lpf is positive upon the motor angular velocity ω increasing, the fundamental voltage correction Vα is positive, and, because the motor angular acceleration ωdot_lpf is negative upon the motor angular velocity ω decreasing, the fundamental voltage correction Vα is negative.

Following the operation in step S104, the execution determiner 57 receives, in the corresponding present cycle, the q-axis current command Iq* and the q-axis current value Iq sent from the respective current command calculator 60 and three-phase to two-phase converter 54. Then, in step S106, the execution determiner 57 determines, in the corresponding present cycle, whether to execute a voltage correction task based on the voltage correction Vα* in accordance with at least one of the q-axis current command Iq*, the q-axis current value Iq, and the motor angular acceleration ωdot_lpf (or the motor angular velocity ω).

In particular, the execution determiner 57 determines, in the corresponding present cycle, whether at least one of the following first to third conditions (i), (ii), and (iii) is satisfied, and determines, in the corresponding present cycle, to execute the voltage correction task based on the voltage correction Vα* upon determining that at least one of the following first to third conditions (i) to (iii) is satisfied:

(i) First condition is that the absolute value of the q-axis current value Iq is higher than a predetermined current determination threshold (ii) Second condition is that the absolute value of the difference between the q-axis current command Iq* and the q-axis current value Iq is larger than a predetermined difference determination threshold (iii) Third condition is that the absolute value of the motor angular acceleration ωdot_lpf is larger than a predetermined acceleration threshold The execution determiner 57 can determine whether the absolute value of the q-axis current command Iq* is higher than a predetermined current command determination threshold in place of the q-axis current value Iq in the first condition.

The execution determiner 57 can determine whether the absolute value of the motor angular velocity ω is larger than a predetermined angular velocity threshold in the third condition. In addition, the execution determiner 57 can determine whether both the condition that the absolute value of the motor angular acceleration ωdot_lpf is larger than the predetermined angular-velocity change acceleration and the motor angular velocity ω is larger than the predetermined angular velocity threshold are satisfied as the third condition.

The execution determiner 57 can determine, in the corresponding present cycle, to execute the voltage correction task based on the voltage correction Vα* upon only determining that all the first to third conditions (i) to (iii) are satisfied.

The execution determiner 57 can obtain at least one of the parameters Iq*, Iq, ωdot_lpf, and ω required for the selected at least one of the first to third conditions (i), (ii), and (iii) without obtaining the other at least one parameter, which is not required for the selected at least one of the first to third conditions (i), (ii), and (iii).

Moreover, the execution determiner 57 can use a physical parameter that is proportional to the rotational speed of the motor 80, such as the electrical angle θe of the motor 80 based on the motor rotational angle θ, or an electrical angular velocity of the motor 80 based on the motor angular velocity ω, in place of the motor angular acceleration ωdot_lpf or motor angular velocity ω in the third condition. Additionally, the execution determiner 57 can use, as the physical parameter that is proportional to the rotational speed of the motor 80, the steering speed Vs in place of the motor angular acceleration ωdot_lpf or motor angular velocity ω in the third condition.

Upon it being determined that the execution determiner 57 should execute the voltage correction task based on the voltage correction Vα* (YES in step S106), the correction voltage calculation routine proceeds to step S107. Otherwise, upon it being determined that the execution determiner 57 should now execute the voltage correction task based on the voltage correction Vα* (NO in step S106), the correction voltage calculation routine proceeds to step S108.

In step S107, the execution determiner 57 increases a previous value of the correction execution gain G in the previous motor control cycle by a predetermined increment to obtain a present value of the correction execution gain G in the corresponding present motor control cycle, or maintains the correction execution gain G to 1 upon the previous vale of the correction execution gain G in the previous motor control cycle being 1; the correction execution gain G is within the range from 0 to 1 inclusive.

In step S108, the execution determiner 57 decreases the previous value of the correction execution gain G in the previous motor control cycle by a predetermined decrement to obtain a present value of the correction execution gain G in the corresponding present motor control cycle, or maintains the correction execution gain G to 0 upon the previous vale of the correction execution gain G in the previous motor control cycle being 0.

Figure 6A:
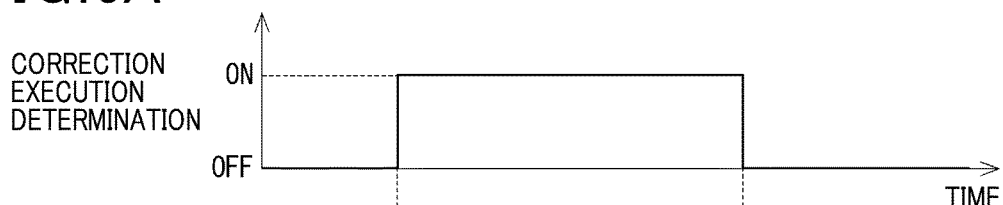
FIGS. 6A to 6E are a joint timing chart schematically illustrating how the controller executes a voltage correction task according to the first embodiment.

The following describes an example of the determination of whether the execution determiner 57 executes the voltage correction task with reference to FIG. 6A, and describes examples of how the correction execution gain G changes with reference to FIGS. 6B to 6E in the example illustrated in FIG. 6A.

In FIG. 6A, reference character ON represents that the execution determiner 57 determines execution of the voltage correction task, and reference character OFF represents that the execution determiner 57 determines inexecution of the voltage correction task.

That is, FIG. 6A shows that the execution determiner 57 determines execution of the voltage correction task at time t1, and performs continuous determination to execute the voltage correction task until time t2, and determines inexecution of the voltage correction task at the time t2.

Figure 6B:
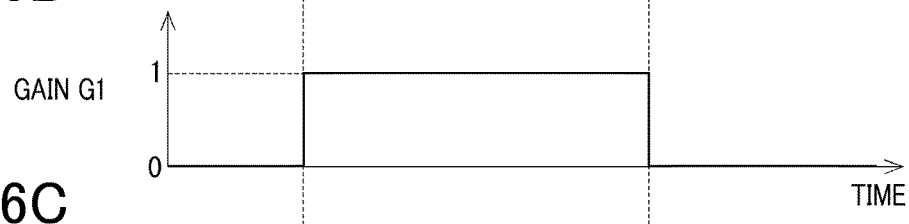

FIG. 6B shows that the execution determiner 57 immediately increases the previous value 0 of a first example G1 of the correction execution gain G in the previous motor control cycle up to 1 at the time t1, maintains the first example G1 of the correction execution gain G being 1 until the time t2, and immediately decreases the previous value 1 of the first example G1 of the correction execution gain G in the previous motor control cycle up to 0 at the time t2.

Figure 6C:
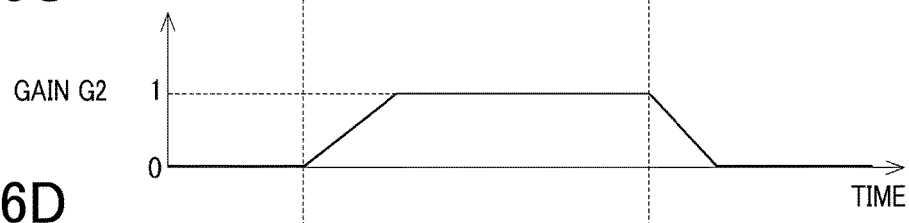

FIG. 6C shows that the execution determiner 57 increases, by a predetermined increase rate, the previous value 0 of a second example G2 of the correction execution gain G in the previous motor control cycle up to 1 from the time t1 to time t1a, and maintains the second example G2 of the correction execution gain G being 1 until the time t2. FIG. 6C also shows that, at the time t2, the execution determiner 57 decreases, by a predetermined decrease rate, the previous value 1 of the second example G2 of the correction execution gain G in the previous motor control cycle down to 0 from the time t2 to time t2a.

Figure 6D:
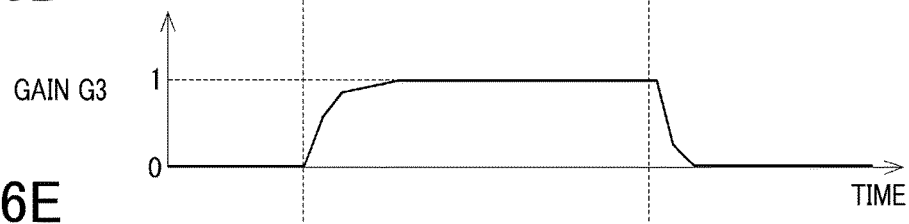

FIG. 6D shows that the execution determiner 57 increases, by a predetermined time constant of a low-pass filter, the previous value 0 of a third example G3 of the correction execution gain G in the previous motor control cycle up to 1 from the time t1 to time t1b, and maintains the third example G3 of the correction execution gain G being 1 until the time t2. FIG. 6D also shows that, at the time t2, the execution determiner 57 decreases, by a predetermined time constant of a low-pass filter, the previous value 1 of the third example G3 of the correction execution gain G in the previous motor control cycle down to 0 from the time t2 to time t2b.

Figure 6E:
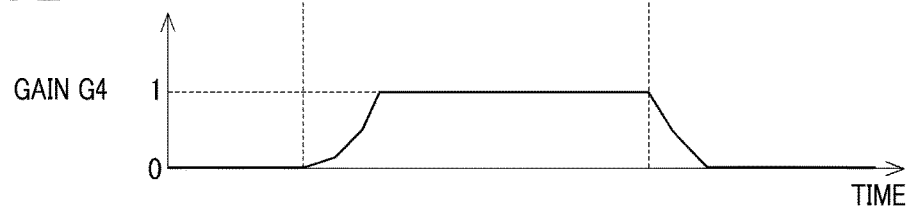

FIG. 6E shows that the execution determiner 57 increases, in the form of a quadratic function, the previous value 0 of a fourth example G4 of the correction execution gain G in the previous motor control cycle up to 1 from the time t1 to time t1c, and maintains the fourth example G4 of the correction execution gain G being 1 until the time t2. FIG. 6E also shows that, at the time t2, the execution determiner 57 decreases, in the form of a quadratic function, the previous value 1 of the fourth example G4 of the correction execution gain G in the previous motor control cycle down to 0 from the time t2 to time t3b.

The execution determiner 57 can combine an increase of the correction execution gain G using one of the first to fourth examples G1 to G4 with a decrease of the correction execution gain G using one of the first to fourth examples G1 to G4.

Hereinafter, the execution determiner 57 according to the first embodiment is configured to increase or decrease the correction execution gain G using the first example G1 illustrated in FIG. 6B.

Following the operation in step S107 or S108, the execution determiner 57 calculates the voltage correction Vα* in accordance with, for example, the following equation (2) in step S109:

$$V\alpha^* = V\alpha \times G \quad (2)$$

Next, the execution determiner 57 performs an upper-lower limit guard task for the voltage correction Vα* in step S110.

Figure 7:
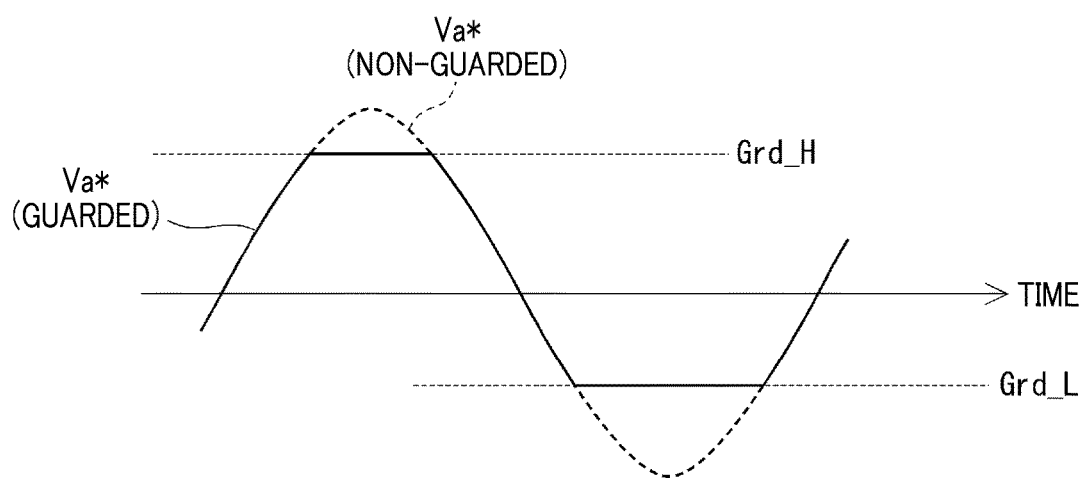
FIG. 7 is a graph schematically illustrating how an upper-lower limit guard level task is carried out by the controller.

Referring to FIG. 7, the upper-lower limit guard task is configured to (1) Determine the voltage correction Vα*, which has not been subjected to the upper-lower limit guard task, is higher than an upper limit guard level Grd_H or lower than a lower limit guard level Grd_L (2) Set the voltage correction Vα* to the upper limit guard level Grd_H upon determining that the voltage correction Vα*, which has not been subjected to the upper-lower limit guard task, is higher than the upper limit guard level Grd_H (3) Set the voltage correction Vα* to the lower limit guard level Grd_L upon determining that the voltage correction Vα*, which has not been subjected to the upper-lower limit guard task, is lower than the lower limit guard level Grd_L Hereinafter in the first embodiment, the voltage correction Vα*, which has been subjected to the upper-lower limit guard task, will be referred to simply as the voltage correction Vα* or to as the guarded voltage correction Vα*, and the voltage correction Vα*, which has not been subjected to the upper-lower limit guard task, will also be referred to as an unguarded voltage correction Vα*.

The voltage correction Vα* obtained in each motor control cycle is input to the voltage corrector 63, and the voltage correction Vα*(n−1) is input to the q-axis feedback controller 62, so that the voltage corrector 63 corrects the q-axis voltage command Vq* to the corrected q-axis voltage command Vq**.

That is, calculation of the voltage correction Vα*, sending of the voltage correction Vα* to the voltage corrector 63, sending of the voltage correction Vα*(n−1) to the q-axis feedback controller 62, which are carried out by the execution determiner 57, and correcting the q-axis voltage command Vq* based on the voltage correction Vα* and the voltage correction Vα*(n−1) for example constitute the voltage correction task according to the first embodiment. Sending of the voltage correction Vα*(n−1) to the q-axis feedback controller 62 can be eliminated from the voltage correction task.

In particular, the operation in step S108 reduces the gain G to be finally zero, thus setting the voltage correction Vα* to be zero. This causes correction of the q-axis voltage command Vq* to converge on zero or prevents the voltage corrector 63 from correcting the q-axis voltage command Vq*, so that the q-axis voltage command Vq* is input to the two-phase to three-phase converter 66. That is, determination that the execution determiner 57 should not execute the voltage correction task based on the voltage correction Vα* results in non-execution of the voltage control task of correcting the q-axis voltage command Vq*.

Note that the execution determiner 57 calculates the fundamental voltage correction Vα using the motor angular acceleration ωdot_lpf, calculates the voltage correction Vα* based on the fundamental voltage correction Vα, and applies the upper-lower limit guard task to the unguarded voltage correction Vα*, but the present disclosure is not limited thereto.

Specifically, execution determiner 57 can apply the upper-lower limit guard task to the motor angular acceleration ωdot_lpf to thereby obtain a guarded motor angular acceleration ωdot_lpf, calculate a guarded fundamental voltage correction Vα using the guarded motor angular acceleration ωdot_lpf, and calculates the voltage correction Vα* based on the guarded fundamental voltage correction Vα.

Next, the following describes how the controller 50 is operated based on the voltage correction task according to the first embodiment with reference to FIGS. 8A to 8E. The following also describes how the controller 50, which does not execute the voltage correction task, is operated according to a first comparative example with reference to FIGS. 9A to 9D. Additionally, the following describes how the controller 50, which executes the voltage correction task using the motor angular velocity ω in place of the motor angular acceleration ωdot_lpf, is operated according to a second comparative example with reference to FIGS. 10A to 10E.

Note that, because the controller 50 according to the first comparative example does not perform the voltage correction task, the correction execution gain G is set to zero, and the q-axis voltage command Vq* is regarded as the corrected q-axis voltage command Vq**.

FIGS. 8A to 8E, 9A to 9E, and 10A to 10E have a common temporal axis as their horizontal axis.

Each of FIGS. 8A to 10A shows how the angular velocity ω is changed over time, and each of FIGS. 8B to 10B shows how the q-axis current Iq is changed over time. Each of FIGS. 8C to 10C shows how the correction execution gain G is changed over time, and each of FIGS. 8D to 10D shows how the corrected q-axis voltage command Vq** is changed over time.

Figure 8A:
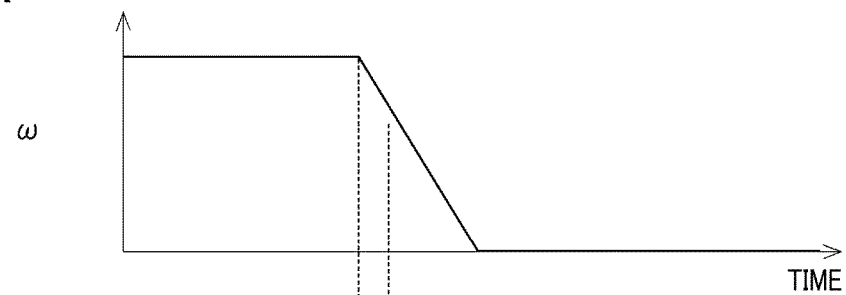
FIGS. 8A to 8E are a joint timing chart schematically illustrating how the controller is operated based on the voltage correction task according to the first embodiment.
Figure 8B:
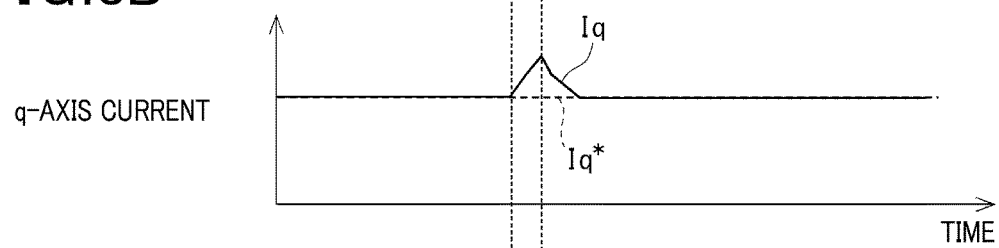
Figure 8C:
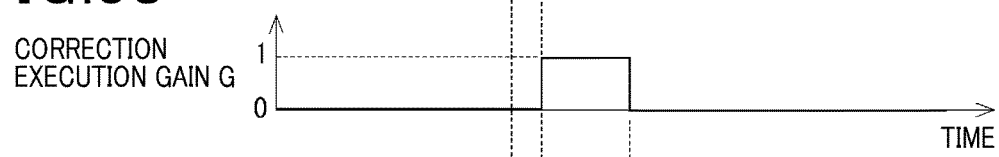
Figure 8D:
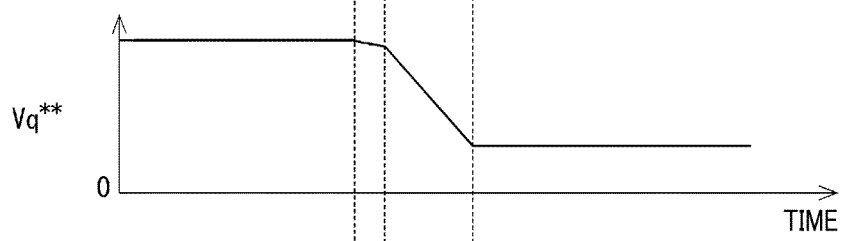
Figure 8E:
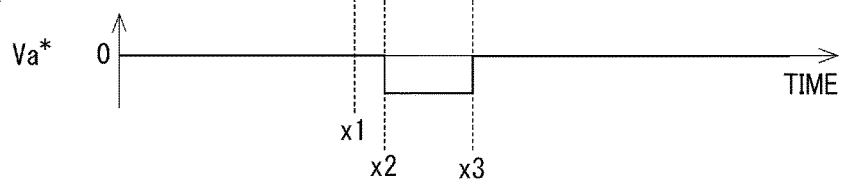
Figure 10A:
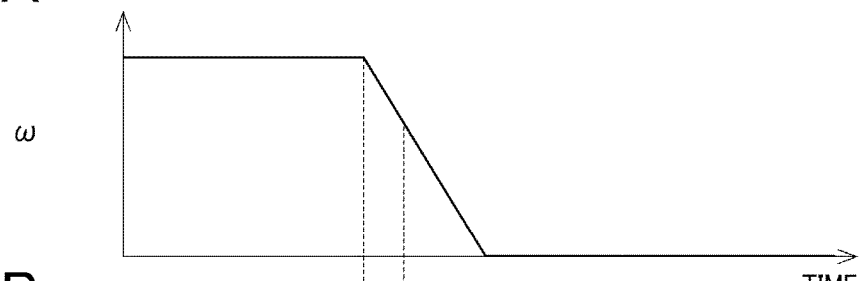
FIGS. 10A to 10E are a joint timing chart schematically illustrating how the controller, which executes the voltage correction task using a motor angular velocity in place of a motor angular acceleration, is operated according to a second comparative example.
Figure 10B:
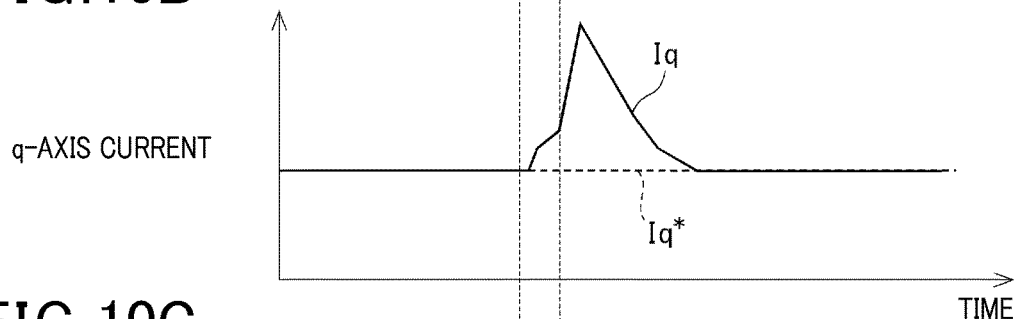
Figure 10C:
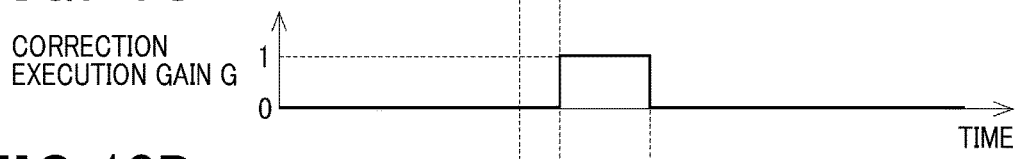
Figure 10D:
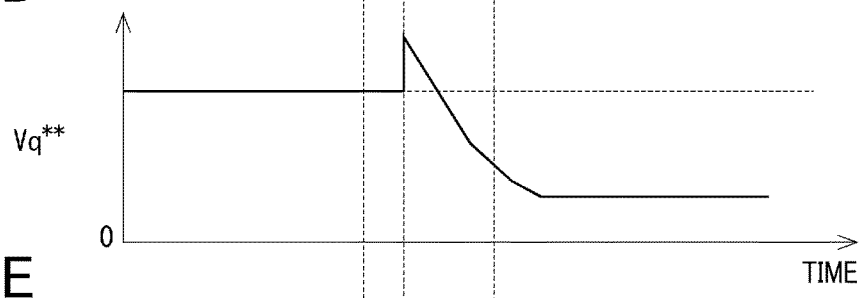
Figure 10E:
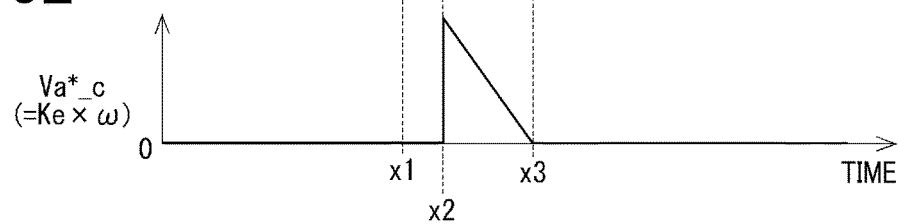

FIG. 8E shows how the unguarded or guarded voltage correction Vα* obtained based on the motor angular acceleration ωdot_lpf and FIG. 10E shows how an unguarded or guarded voltage correction Vα*_c obtained based on the motor angular velocity ω in place of the motor angular acceleration ωdot_lpf.

Figure 9A:
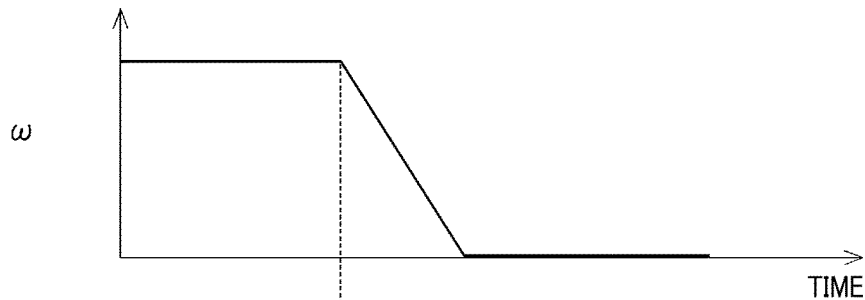
FIGS. 9A to 9D are a joint timing chart schematically illustrating how the controller, which does not execute the voltage correction task, is operated according to a first comparative example.
Figure 9B:
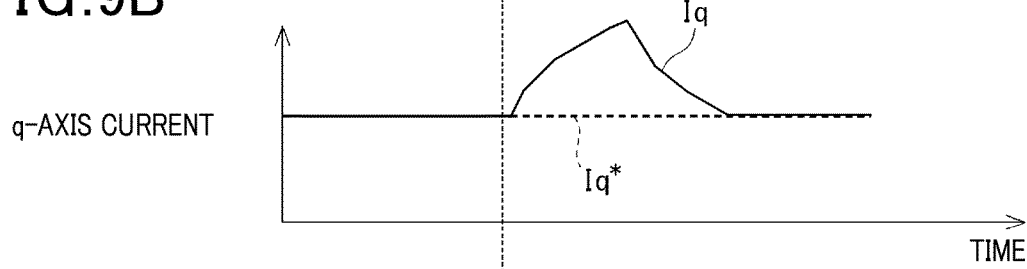
Figure 9C:
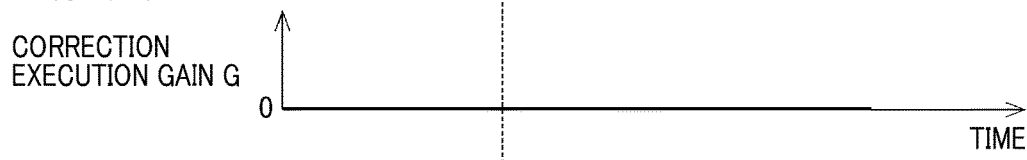
Figure 9D:
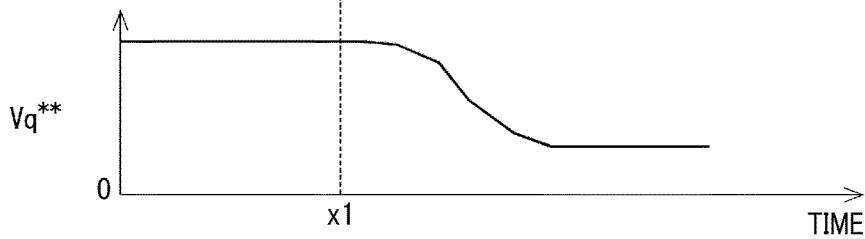

Referring to FIG. 9A, if the motor 80 is suddenly stopped so that the motor angular velocity ω is suddenly reduced at time x1, a back electromotive force based on the sudden reduction of the motor angular velocity ω may result in the occurrence of overshoot of the q-axis current Iq (see FIG. 9B). In order to address the sudden reduction of the motor angular velocity ω, the first exemplary example changes the q-axis current command Iq*. This however may take some time for feedback controlling the corrected q-axis voltage command Vq** based on the feedback operation of the q-axis current Iq and the q-axis current command Iq*, resulting in comparatively long time required for the q-axis current value Iq to converge to the q-axis current command Iq*. The overshoot of the q-axis current Iq may also result in a large impact applied to the steering system 90.

The control apparatus according to the published patent document specially determines whether the steering wheel reaches the upper limit.

Upon determining that the steering wheel reaches the upper limit, the control apparatus according to the published patent document holds a value of the commanded current to the actual current value measured by the current sensor immediately before the occurrence of the steering limit situation. This limits the value of the commanded current to be lower than an actual value, i.e. an upper limit value, measured at the occurrence of the steering limit situation. This results in reduction of an impact applied to the steering mechanism due to the sudden stop of the motor.

Unfortunately, the control apparatus disclosed in the published patent document cannot limit the value of the commanded current to be lower than the upper limit value if the actual current value measured by the current sensor immediately before the occurrence of the steering limit situation has already reached the upper limit value. The control apparatus disclosed in the published patent document also cannot limit the value of the commanded current to be lower than the upper limit value if the value of the commanded value is equal to the actual current value measured by the current sensor immediately before the occurrence of the steering limit situation. These cases may not limit the variations in an actual current supplied to the motor due to sudden stop of the motor, resulting in difficulty in reduction of an impact applied to the steering mechanism due to the sudden stop of the motor.

On the other hand, let us consider that a method of feedforward controlling a q-axis voltage command to a theoretical value that enables the back electromotive force to be compensated. This method may however result in deviation, from the theoretical value, of the actual value of the q-axis voltage command due to, for example, measurement errors included in the measured rotational speed of the motor and/or distortion of the back electromagnetic force. This may result in change in the q-axis current. This change in the q-axis current may cause the driver of the corresponding vehicle to have bad feeling upon the driver operating the steering wheel 91 if the method is applied to the electric power steering system 8.

On the other hand, FIGS. 10A to 10E show the second comparison example in which the controller 50 calculates the voltage correction Vα*_c based on the motor angular velocity ω in place of the motor angular acceleration ωdot_lpf, and corrects the q-axis voltage command Vq* based on the voltage correction Vα*_c to thereby calculate the corrected q-axis voltage command Vq**.

As described above, it is preferable that no correction of the q-axis voltage command is performed while the motor 80 is operating in a steady state in view of driver's steering feeling. That is, the controller 50 is preferably configured to switch its operation mode from a steady mode in which the controller 50 does not execute the voltage correction task to a correction mode in which the controller 50 executes the voltage correction task upon detection of sudden reduction of the rotational speed of the motor 80.

While the controller 50 is operating in the steady mode, if the motor 80 is suddenly stopped and the motor angular velocity ω is suddenly reduced at the time x1 so that the controller 50 switches its operation mode from the steady mode to the correction mode at time x2 (YES in step S106), the q-axis voltage command Vq* is corrected as the corrected q-axis voltage command Vq** at the time x2 to be larger (see FIG. 10E), because the voltage correction Vα*_c is calculated in accordance with the following equation (Vα*_c=Ke×ω). This therefore may result in the occurrence of larger overshoot as compared with the first comparison example that performs no voltage correction task.

In contrast, the controller 50 according to the first embodiment is configured to perform the voltage correction task to thereby calculate the voltage correction Vα* based on the motor angular acceleration ωdot_lpf. This configuration enables the q-axis voltage command Vq* to be rapidly corrected to decrease if the controller 50 switches its operation mode from the steady mode to the correction mode at time x2 due to sudden stop of the motor 80 (YES in step S106), because the motor angular acceleration ωdot_lpf is negative upon the motor angular velocity ω decreasing.

The controller 50 is also configured to input the previous voltage correction Vα*(n−1) to the q-axis feedback controller 62 via the previous voltage correction outputting unit 58. Repeat execution of the motor control cycle including feedback operation by the q-axis feedback controller 62 on the basis of this configuration enables the past voltage corrections Vα* to be integrated. Because the voltage corrections Vα* is based on the motor angular acceleration ωdot_lpf, which is obtained by differentiating the motor angular velocity ω, integrating the past voltage corrections Vα* achieves a result equivalent to the result that the q-axis voltage command Vq* is corrected based on the term, i.e. (Ke×ω), of the back electromotive force in the theoretical motor voltage equation.

Specifically, the controller 50 is configured to execute the voltage correction task during the period from the time x2 to the time x3 for which the controller 50 has determined to execute the voltage correction task. In other words, the controller 50 is configured not to execute the voltage correction task while the motor 80 is operating in the steady state.

This configuration enables the q-axis voltage command Vq* to be rapidly corrected to decrease upon the motor 80 being stopped suddenly, resulting in reliable reduction of the overshoot of the q-axis current Iq due to sudden stop of the motor 80. This therefore results in reduction of an impact applied to the steering mechanism due to the sudden stop of the motor 80.

The controller 50 is also capable of reducing variations in the q-axis current Iq upon the motor 80 being suddenly decelerated in the same manner as reducing variations in the q-axis current Iq upon the motor 80 being suddenly accelerated.

As described above, the motor control apparatus 1 according to the first embodiment, which serves to control the motor 80 including the coil assembly 81, is comprised of the inverter 20, the current measuring unit 30, the rotational angle sensor 45, and the controller 50.

The inverter 20 is comprised of the switching elements 21 to 26, and the current measuring unit 30 is configured to measure a current flowing through the coil assembly 81. The rotational angle sensor 45 is configured to measure the rotational angle θ of the motor 80.

The controller 50 controls switching operations of the switching elements 21 to 26 to thereby control how the motor 80 is driven. The controller 50 includes the q-axis feedback controller 62, the fundamental voltage correction calculator 56, the execution determiner 57, the voltage corrector 63, and the previous voltage correction outputting unit 58.

The q-axis feedback controller 62 calculates, in accordance with the q-axis current command Iq* and the q-axis current value Iq based on the current measured by the current measuring unit 30, the q-axis voltage command Vq*.

The fundamental voltage correction calculator 56 calculates the fundamental voltage correction Vα as a function of the motor angular acceleration ωdot that is calculated based on the rotational angle θ of the motor 80.

The execution determiner 57 determines whether to execute the voltage correction task that corrects the q-axis voltage command Vq*, and calculates the voltage correction Vα* in accordance with (1) The fundamental voltage correction Vα

(2) The result of determination of whether to execute the voltage correction task Specifically, the controller 50 is configured to perform the voltage correction task that calculates the voltage correction Vα* based on the motor angular acceleration ωdot and feeds back the previous voltage correction Vα*(n−1) to the q-axis feedback controller 62 upon the controller 50 determining to execute the voltage correction task. This reduces variations in the q-axis current Iq, i.e. the three-phase currents Iu, Iv, and Iw flowing through the motor 80, due to sudden change in the rotating state of the motor 80.

In addition, the controller 50 is configured to non-execute correction of the q-axis voltage command Vq* or cause correction of the q-axis voltage command Vq* on zero upon determining not to execute the voltage correction task, i.e. upon determining that the motor 80 is operating in the steady state. This reduces variations in the q-axis current Iq down to a lower level while the motor 80 is operating in the steady state as compared with the case where feedforward correction of the q-axis voltage command is always carried out for compensation of the back electromotive force.

As a first example, the execution determiner 57 is configured to determine whether to execute the voltage correction task based on at least one of the q-axis current command Iq* and the q-axis current value Iq.

Specifically, the execution determiner 57 determines to execute the voltage correction task upon determining that the absolute value of at least one of the q-axis current command Iq* and the q-axis current value Iq is higher than a predetermined current determination threshold. This reliably reduces the occurrence of an overshoot of the q-axis current Iq.

As a second example, the execution determiner 57 is configured to determine whether to execute the voltage correction task as a function of the absolute value of the difference between the q-axis current command Iq* and the q-axis current value Iq.

Specifically, the execution determiner 57 determines to execute the voltage correction task upon determining that the absolute value of the difference between the q-axis current command Iq* and the q-axis current value Iq is larger than a predetermined difference determination threshold. This enables the q-axis current value Iq to rapidly converge on the q-axis current command Iq*.

As a third example, the execution determiner 57 is configured to determine whether to execute the voltage correction task as a function of information associated with the rotational speed of the motor 80. The information associated with the rotational speed of the motor 80 includes, for example, at least one of the motor angular acceleration ωdot_lpf and the motor angular velocity ω.

Specifically, the execution determiner 57 determines to execute the voltage correction task upon determining that the absolute value of at least one of the motor angular acceleration ωdot_lpf and the motor angular velocity ω is larger than a predetermined acceleration threshold. This enables variations in the q-axis current value Iq, i.e. the three-phase currents Iu, Iv, and Iw flowing through the motor 80, due to sudden change in the rotating state of the motor 80 to be reliably reduced.

The execution determiner 57 is configured to calculate the voltage correction Vα* based on a value of the correction execution gain G and the fundamental voltage correction Vα; the value of the voltage correction Vα* depends on whether the execution determiner 57 executes the voltage correction task. This configuration, which calculates the voltage correction Vα* based on the correction execution gain G, enables a value of the voltage correction Vα* suitable for the requirement of whether the voltage correction task is carried out.

The controller 50 is configured to filter the voltage correction Vα* or at least one parameter, such as the motor angular acceleration ωdot, required to calculate the voltage correction Vα*, thus limiting the frequency range of the voltage correction Vα* to a predetermined narrow frequency range. That is, the expression that the voltage correction Vα*, which has passed through a predetermined limited frequency range, includes (1) The voltage correction Vα* itself has been filtered (2) At least one parameter, such as the motor angular acceleration ωdot, required to calculate the voltage correction Vα*, has been filtered This configuration enables high-frequency components included in the voltage correction Vα* to be eliminated, thus preventing rapid change of the voltage correction Vα*.

The execution determiner 57 is configured to set a range of the voltage correction Vα* to be equal to or lower than the upper limit guard level Grd_H and to be equal to or higher than the lower limit guard level Grd_L. This configuration prevents the q-axis voltage command Vq* from being excessively corrected.

The motor control apparatus 1 includes the temperature detector 47 that measures the internal temperature Tmp thereof, and is configured to variably set a value of the voltage correction Vα* depending on the measured value of the internal temperature Tmp. In detail, the controller 50 is configured to variably set a value of the conversion coefficient Ke used to convert the motor angular acceleration ωdot_lpf to a voltage change component. This configuration enables a value of the voltage correction Vα* suitable for the internal temperature Tmp of the motor control apparatus 1 to be calculated.

The motor control apparatus 1 according to the first embodiment is applied to the electric power steering system 8. The electric power steering system 8 includes the motor control apparatus 1, the motor 80, and the deceleration gear mechanism 89. The motor 80 is configured to output assist torque for assisting the driver's steering operation of the steering wheel 91. The deceleration gear mechanism 89 is configured to transfer the assist torque generated based on the turning of the shaft 85 of the motor 80 to the steering shaft 92 while decelerating the rotational speed of the motor 80, i.e. increasing the assist torque generated by the motor 80.

The motor control apparatus 1 according to the first embodiment reduces variations in the q-axis current Iq upon the motor 80 being suddenly changed, resulting in proper reduction of an impact applied to the steering mechanism due to the sudden stop of the motor 80.

In the first embodiment, the q-axis feedback controller 62 corresponds to, for example, a voltage command calculator. The q-axis current command Iq* corresponds to, for example, a current command, and the q-axis current Iq corresponds to, for example, a motor current parameter, and the q-axis voltage command Vq* corresponds to, for example, a voltage command.

Second Embodiment

Figure 11:
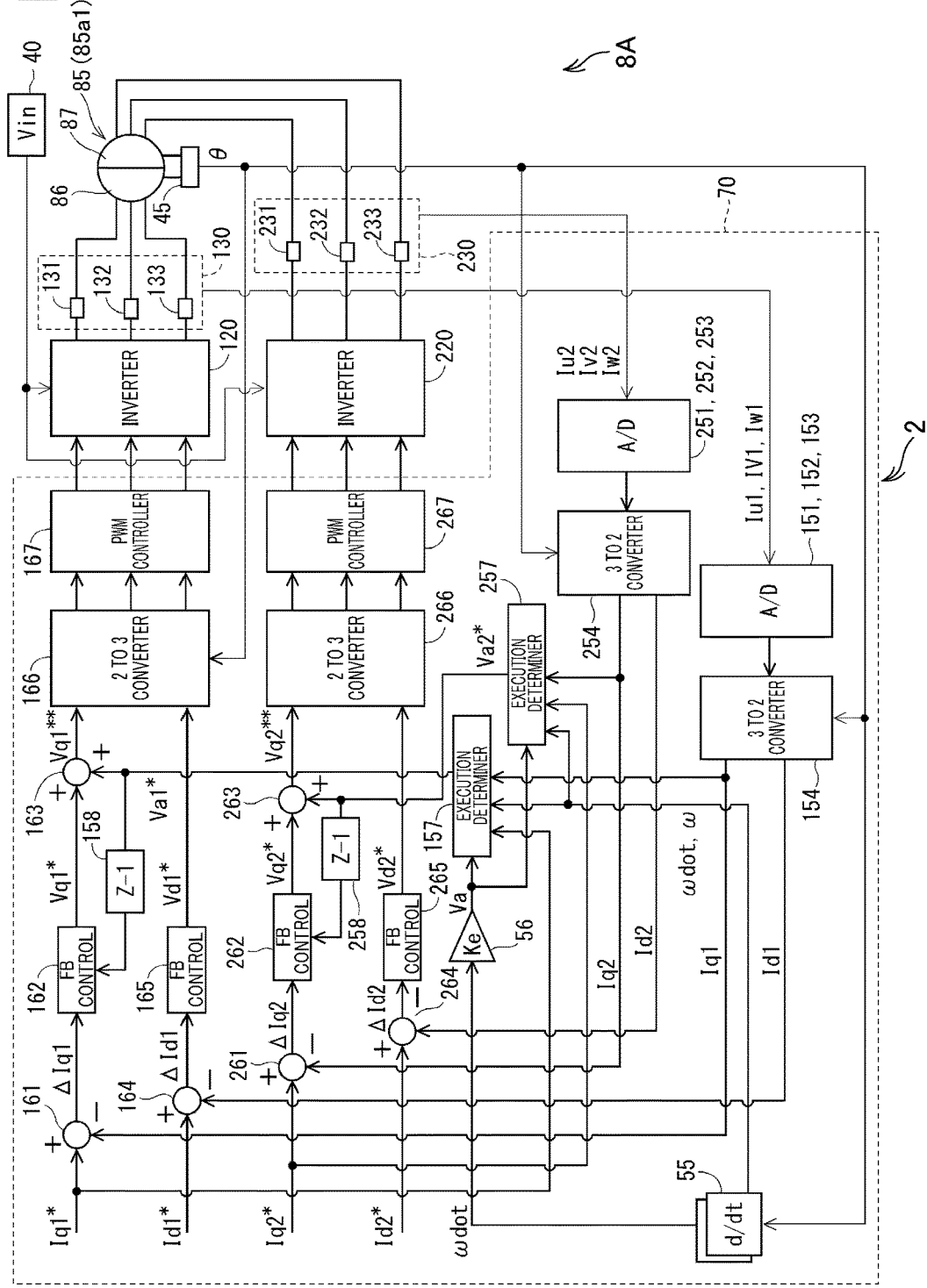
FIG. 11 is a block diagram schematically illustrating functional modules of a controller of a motor control apparatus according to the second embodiment of the present disclosure.

Next, the following describes the second embodiment of the present disclosure with reference to FIG. 11. The second embodiment differs from the first embodiment in the following points. So, the following mainly describes the different points, and omits or simplifies descriptions of like parts between the first and second embodiments, to which identical or like reference characters are assigned, thus eliminating redundant description.

An electric power steering system 8A according to the second embodiment includes a motor 85 and a motor control apparatus 2.

The motor 85 includes a stator 85a1, which is different from the motor 80 according to the first embodiment.

The stator 85a1 includes a first set 86 of the three-phase coils (U, V, and W-phase coils) wound in and around the stator core, and a second set 87 of three-phase stator coils (U, V, and W-phase coils) wound in and around the stator core.

The motor control apparatus 2 includes the power-supply input circuit 10, a first inverter 120 for driving of the first coil set 86, a second inverter 220 for driving of the second coil set 87, a first current measuring unit 130, a second current measuring unit 230, the voltage monitor 40, the rotational angle sensor 45, the temperature detector 47, and a controller 70.

Note that the combination of the first inverter 120 and the first coil set 86 will be referred to as a first motor system, and the combination of the second inverter 220 and the second coil set 87 will be referred to as a second motor system. Hereinafter, reference numerals in the 100s represent components associated with the first motor system, and reference numerals in the 200s represent components associated with the second motor system. As described above, if the last two digits in a reference numeral of at least one component in the first and second motor systems is identical to the reference numeral of a corresponding component described in the first embodiment, the at least one component is functionally equivalent to the corresponding component described in the first embodiment. Descriptions of the at least one component are therefore omitted or simplified.

Additionally, the word "first" is assigned to the name of each component in the first motor system, and the word "second" is assigned to the name of each component in the second motor system. Index 1 is assigned to each parameter or a value of each parameters associated with the first motor system, and index 2 is assigned to each parameter or a value of each parameters associated with the second motor system.

For example, a q-axis current flowing in the first motor system will be referred to as a first q-axis current Iq1, and a q-axis current flowing in the second motor system will be referred to as a second q-axis current Iq2.

The first current measuring unit 130 includes current sensor elements 131, 132, and 133 for outputting, to the controller 70, respective U-, V-, and W-phase current parameters indicative of the U-, V-, and W-phase current Iu1, Iv1, and Iw1 flowing in the first motor system.

The second current measuring unit 230 includes current sensor elements 231, 232, and 233 for outputting, to the controller 70, respective U-, V-, and W-phase current parameters indicative of the U-, V-, and W-phase current Iu2, Iv2, and Iw2 flowing in the second motor system.

The controller 70 includes first A/D converters 151 to 153, second A/D converters 251 to 253, first and second three-phase to two-phase converters 154 and 254, the differential calculator 55, the fundamental voltage correction calculator 56, first and second execution determiners 157 and 257, and first and second previous voltage correction outputting units 158 and 258. The controller 70 also includes the current command calculator 60 (unillustrated in FIG. 11), first and second q-axis subtractors 161 and 261, first and second q-axis feedback controllers 162 and 262, first and second voltage correctors 163 and 263, first and second d-axis subtractors 164 and 264, first and second d-axis feedback controllers 165 and 265, first and second two-phase to three-phase converters 166 and 266, and first and second PWM controllers 167 and 267.

The first three-phase currents Iu1, Iv1 and Iw1, which have been converted into digital values via the first A/D converters 151, 152, and 153, are converted by the first three-phase to two-phase converter 154 into first d- and q-axis current values Id1 and Iq1. Similarly, the second three-phase currents Iu2, Iv2 and Iw2, which have been converted into digital values via the second A/D converters 251, 252, and 253, are converted by the second three-phase to two-phase converter 254 into second d- and q-axis current values Id2 and Iq2.

First d- and q-axis current deviations ΔId1 and ΔIq1 are calculated by the respective first d- and q-axis subtractors 164 and 161, and first d- and q-axis voltage commands Vd1* and Vq1* are calculated by the respective first d- and q-axis feedback controllers 165 and 162 in accordance with the respective first d- and q-axis current deviations ΔId1 and ΔIq1.

Similarly, second d- and q-axis current deviations ΔId2 and ΔIq2 are calculated by the respective second d- and q-axis subtractors 264 and 261, and second d- and q-axis voltage commands Vd2* and Vq2* are calculated by the respective second d- and q-axis feedback controllers 265 and 262 in accordance with the respective second d- and q-axis current deviations ΔId2 and ΔIq2.

The differential calculator 55 calculates at least one of the motor angular velocity ω and the angular acceleration ωdot to each of the first and second execution determiners 157 and 257 as described in the first embodiment. The fundamental voltage correction calculator 56 calculates the fundamental voltage correction Vα as a function of the motor angular acceleration ωdot and the internal temperature Tmp as described in the first embodiment.

The first execution determiner 157, which is provided for the first motor system, determines, in each motor control cycle, whether to execute correction of the first q-axis voltage command Vq1* in accordance with (1) The at least one of the motor angular velocity ω and motor angular acceleration ωdot (2) The first q-axis current value Iq1

(3) The first q-axis current command Iq1*

Then, the first execution determiner 157 calculates a first voltage correction Vα1* as a function of the fundamental voltage correction Vα and a value of the gain G depending on whether the first execution determiner 157 executes the voltage correction task.

That is, the first execution determiner 157 carries out the operations that are identical to those carried out by the execution determiner 57.

The first previous voltage correction outputting unit 158 outputs, in each motor control cycle, a previous first voltage correction Vα1*(n−1) to the first q-axis feedback controller 162; the previous first voltage correction Vα1*(n−1) was a value of the first voltage correction Vα1* calculated by the first execution determiner 157 at the previous motor control cycle (n−1) relative to the corresponding present motor control cycle.

The first q-axis feedback controller 162 performs, for example, the PI feedback operation using the first q-axis current deviation ΔIq1, the previous first voltage correction Vα1*(n−1), and the previous first q-axis voltage command Vq1*(n−1) in each motor control cycle, which is similar to the q-axis feedback controller 62.

The first voltage corrector 163 corrects the first q-axis voltage command Vq1* in accordance with the first voltage correction Vα1* in each motor control cycle to thereby calculate a corrected first q-axis voltage command Vq1**.

Similarly, the second execution determiner 257, which is provided for the second motor system, determines, in each motor control cycle, whether to execute correction of the second q-axis voltage command Vq2* in accordance with (1) The at least one of the motor angular velocity c and motor angular acceleration ωdot (2) The second q-axis current value Iq2

(3) The second q-axis current command Iq2*

Then, the second execution determiner 257 calculates a second voltage correction Vα2* as a function of the fundamental voltage correction Vα and a value of the gain G depending on whether the second execution determiner 257 executes the voltage correction task.

That is, the second execution determiner 257 carries out the operations that are identical to those carried out by the execution determiner 57.

The second previous voltage correction outputting unit 258 outputs, in each motor control cycle, a previous second voltage correction Vα2*(n−1) to the second q-axis feedback controller 262; the previous second voltage correction Vα2* (n−1) was a value of the second voltage correction Vα2* calculated by the second execution determiner 257 at the previous motor control cycle (n−1) relative to the corresponding present motor control cycle.

The second q-axis feedback controller 262 performs, for example, the PI feedback operation using the second q-axis current deviation ΔIq2, the previous second voltage correction Vα2*(n−1), and the previous second q-axis voltage command Vq2(n−1) in each motor control cycle, which is similar to the q-axis feedback controller 62.

The second voltage corrector 263 corrects the second q-axis voltage command Vq2* in accordance with the second voltage correction Vα2* in each motor control cycle to thereby calculate a corrected second q-axis voltage command Vq2**.

As described above, the motor 85 of the electric power steering system 8A includes the first coil set 86 of the three-phase coils, and the second coil set 87 of three-phase stator coils.

The motor control apparatus 2 includes the first inverter 120 for driving of the first coil set 86 and the second inverter 220 for driving of the second coil set 87.

The electric power steering system 8A configured set forth above achieves the advantageous effects that are identical to the advantageous effects achieved by the electric power steering system 8.

This configuration enables, even if there is a malfunction in one of the first and second motor systems, the motor control apparatus 2 to continuously drive the motor 85 using the other of the first and second motor systems.

The motor control apparatus 2 includes the first execution determiner 157, which is provided for the first motor system, and the second execution determiner 257, which is provided for the second motor system.

The first execution determiner 157 determines, in each motor control cycle, whether to execute correction of the first q-axis voltage command Vq1* in accordance with (1) The at least one of the motor angular velocity ω and motor angular acceleration ωdot (2) The first q-axis current value Iq1

(3) The first q-axis current command Iq1*

Similarly, the second execution determiner 257 determines, in each motor control cycle, whether to execute correction of the second q-axis voltage command Vq2* in accordance with (1) The at least one of the motor angular velocity ω and motor angular acceleration ωdot (2) The second q-axis current value Iq2

(3) The second q-axis current command Iq2*

This enables whether execution of the voltage correction task is required to be properly determined for each of the first and second motor systems.

The first and second previous voltage correction outputting units 158 and 25 are provided for the respective first and second motor systems, and the first and second q-axis feedback controllers 162 and 262 are provided for the respective first and second motor systems.

The first previous voltage correction outputting unit 158 outputs, in each motor control cycle, the previous first voltage correction Vα1*(n−1) to the first q-axis feedback controller 162. Then, the first q-axis feedback controller 162 performs, for example, the PI feedback operation using the first q-axis current deviation ΔIq1, the previous first voltage correction Vα1*(n−1), and the previous first q-axis voltage command Vq1*(n−1) in each motor control cycle. The first voltage corrector 163 corrects the first q-axis voltage command Vq1* in accordance with the first voltage correction Vα1* in each motor control cycle to thereby calculate the corrected first q-axis voltage command Vq1**.

Similarly, the second previous voltage correction outputting unit 258 outputs, in each motor control cycle, the previous second voltage correction Vα2*(n−1) to the second q-axis feedback controller 262. Then, the second q-axis feedback controller 262 performs, for example, the specific PI feedback operation using the second q-axis current deviation ΔIq2, the previous second voltage correction Vα2*(n−1), and the previous second q-axis voltage command Vq2*(n−1) in each motor control cycle. The second voltage corrector 263 corrects the second q-axis voltage command Vq2* in accordance with the second voltage correction Vα2* in each motor control cycle to thereby calculate the corrected second q-axis voltage command Vq2**.

This configuration therefore enables the corrected first q-axis voltage command Vq1 and the corrected second q-axis voltage command Vq2 to be calculated suitably for the respective first and second motor systems.

Third Embodiment

Figure 12:
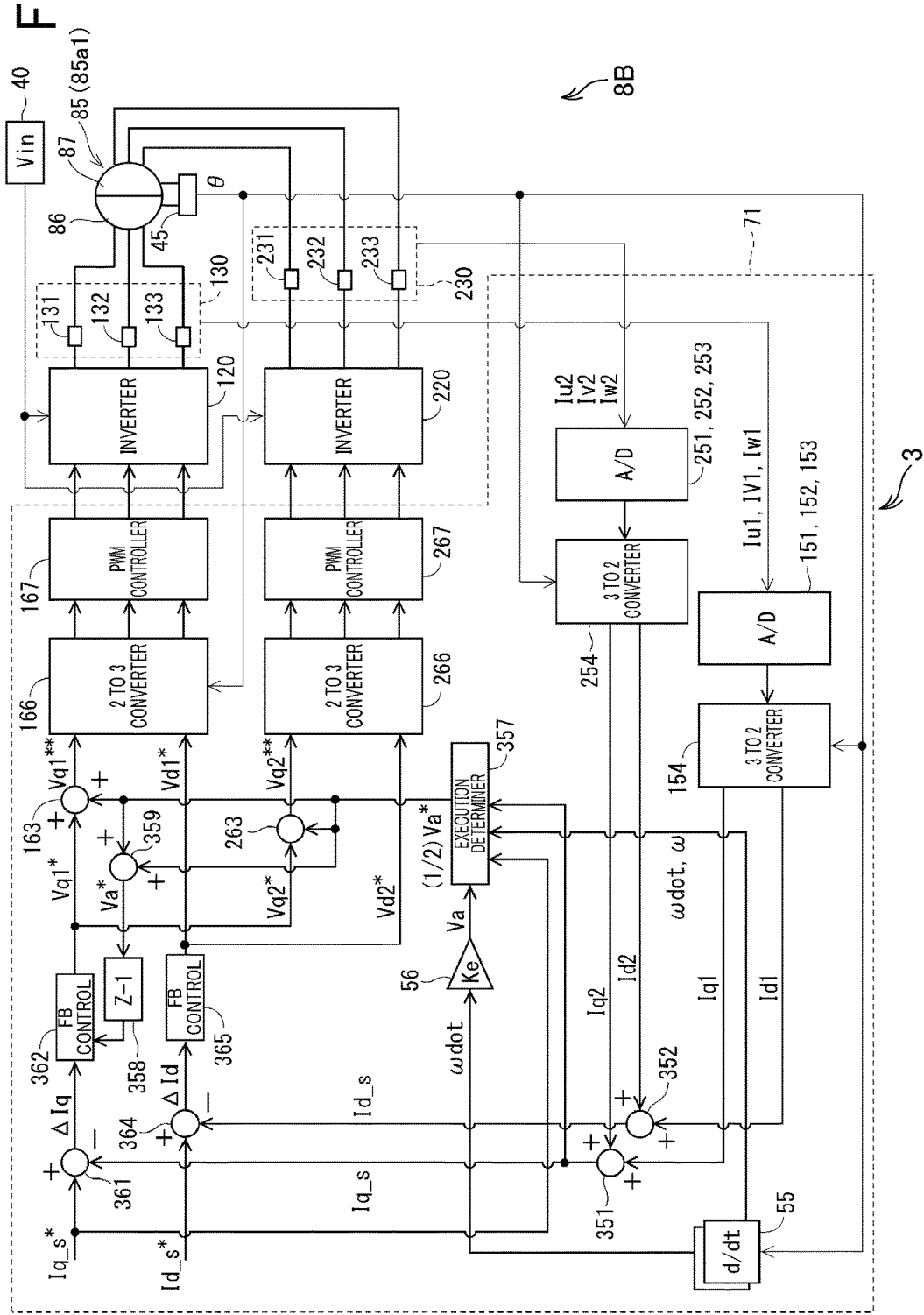
FIG. 12 is a block diagram schematically illustrating functional modules of a controller of a motor control apparatus according to the third embodiment of the present disclosure.

Next, the following describes the third embodiment of the present disclosure with reference to FIG. 12. The third embodiment differs from the second embodiment in the following points. So, the following mainly describes the different points, and omits or simplifies descriptions of like parts between the second and third embodiments, to which identical or like reference characters are assigned, thus eliminating redundant description.

An electric power steering system 8B above includes the motor 85 and a motor control apparatus 3.

The motor 85 includes a stator 85a1, which is different from the motor 80 according to the first embodiment.

The stator 85a1 includes the first coil set 86 of the three-phase coils, and the second coil set 87 of three-phase stator coils.

The motor control apparatus 3 includes the power-supply input circuit 10, the first inverter 120 for driving of the first coil set 86, the second inverter 220 for driving of the second coil set 87, the first current measuring unit 130, the second current measuring unit 230, the voltage monitor 40, the rotational angle sensor 45, the temperature detector 47, and a controller 71.

Note that the combination of the first inverter 120 and the first coil set 86 will be referred to as a first motor system, and the combination of the second inverter 220 and the second coil set 87 will be referred to as a second motor system.

The motor control apparatus 3 according to the third embodiment is specifically configured to control the sum of the first and second d-axis currents Id1 and Id2, the sum of the first and second q-axis currents Iq1 and Iq2, the sum of the first and second d-axis current commands Id* and Id*, and the sum of the first and second q-axis current commands Iq1* and Iq2*.

Hereinafter, reference numerals in the 300s represent components associated with the specific configuration of the motor control apparatus 3. As described above, if the last two digit in a reference numeral of at least one component in the specific configuration of the motor control apparatus 3 is identical to the reference numeral of a corresponding component described in the first embodiment, the at least one component is functionally equivalent to the corresponding component described in the first embodiment. Descriptions of the at least one component are therefore omitted or simplified.

Referring to FIG. 12, the controller 71 includes the first A/D converters 151 to 153, the second A/D converters 251 to 253, the first and second three-phase to two-phase converters 154 and 254, the differential calculator 55, the fundamental voltage correction calculator 56, an execution determiner 357, and a previous voltage correction outputting unit 358. The controller 71 also includes the current command calculator 60 (unillustrated in FIG. 12), a q-axis current adder 351, a d-axis current adder 352, a voltage correction adder 359, a q-axis subtractor 361, a q-axis feedback controllers 362, first and second voltage correctors 163 and 263, a d-axis subtractor 364, a d-axis feedback controller 365, the first and second two-phase to three-phase converters 166 and 266, and the first and second PWM controllers 167 and 267.

The q-axis current adder 351 adds the first and second q-axis currents Iq1 and Iq2 to thereby calculate a q-axis current sum Iq_s. Similarly, the d-axis current adder 352 adds the first and second d-axis currents Id1 and Id2 to thereby calculate a d-axis current sum Id_s.

The q-axis subtractor 361 calculates a q-axis current deviation ΔIq between the q-axis current sum Iq_s and a q-axis current command Iq_s* for the sum of a first q-axis command current for the first motor system and a second q-axis command current for the second motor system. Similarly, the d-axis subtractor 364 calculates a d-axis current deviation ΔId between the d-axis current sum Id_s and a d-axis current command Id_s* for the sum of a first d-axis command current for the first motor system and a second d-axis command current for the second motor system.

The q-axis feedback controllers 362 calculates a q-axis voltage command Vq_s* in accordance with the first q-axis current deviation ΔIq1, which is similar to the q-axis feedback controller 62. The q-axis voltage command Vq_s* represents the sum of a first q-axis voltage command Vq1* and a second q-axis voltage command Vq2* for the second motor system.

In the third embodiment, the first q-axis voltage command Vq1* and the second q-axis voltage command Vq2* are set to be identical to each other. Then, the q-axis feedback controllers 362 multiplies the q-axis voltage command Vq_s* by (½), thus obtaining the first q-axis voltage command Vq1* and the second q-axis voltage command Vq2*. Then, the q-axis feedback controllers 362 outputs the first q-axis voltage command Vq1* and the second q-axis voltage command Vq2* to the respective first and second voltage correctors 163 and 263.

Similarly, the d-axis feedback controllers 365 calculates a d-axis voltage command Vd_s* in accordance with the first d-axis current deviation ΔId1, which is similar to the d-axis feedback controller 65. The d-axis voltage command Vd_s* represents the sum of a first d-axis voltage command Vd1* and a second d-axis voltage command Vd2* for the second motor system.

In the third embodiment, the first d-axis voltage command Vd1* and the second d-axis voltage command Vd2* are set to be identical to each other. Then, the d-axis feedback controllers 365 multiplies the d-axis voltage command Vd_s* by (½), thus obtaining the first d-axis voltage command Vd1* and the second d-axis voltage command Vd2*. Then, the d-axis feedback controllers 365 outputs the first d-axis voltage command Vd1* and the second d-axis voltage command Vd2* to the respective first and second two-phase to three-phase converters 166 and 266.

The execution determiner 357 samples at least one of the motor angular velocity ω and motor angular acceleration ωdot, the q-axis current sum Iq_s, the fundamental voltage correction Vα, and the q-axis current command Iq_s* in each motor control cycle.

Then, the execution determiner 357 determines, in each motor control cycle, whether to execute correction of the first and second q-axis voltage commands Vq1* and Vq2* in accordance with (1) The at least one of the motor angular velocity ω and motor angular acceleration ωdot
(2) The q-axis current sum Iq_s
(3) The q-axis current command Iq_s*

Then, the execution determiner 357 calculates a voltage correction Vα* for the set of the first and second motor systems as a function of the fundamental voltage correction Vα and a value of the gain G depending on whether the execution determiner 57 executes the voltage correction task.

That is, the execution determiner 357 carries out the operations that are identical to those carried out by the execution determiner 57.

Because the first q-axis voltage command Vq1* and the second q-axis voltage command Vq2* are set to be identical to each other, the execution determiner 357 multiplies the voltage correction Vα* by (½), thus obtaining the first voltage correction Vα1* and the second voltage correction Vα2*. Then, the execution determiner 357 outputs the first and second voltage corrections Vα1* and Vα2* to the respective first and second voltage correctors 163 and 263.

If the first q-axis voltage command Vq1* and the second q-axis voltage command Vq2* are set to be different from each other, the execution determiner 357 can divide the voltage correction Vα* into the first voltage correction Vα1* and the second voltage correction Vα2* in accordance with the ratio of the first q-axis voltage command Vq1* to the second q-axis voltage command Vq2*.

The voltage correction adder 359 calculates, in each motor control cycle, the sum of the first and second voltage corrections Vα1* and Vα2* to calculate the voltage correction Vα*, thus outputting the voltage correction Vα* to the previous voltage correction outputting unit 358.

The previous voltage correction outputting unit 358 outputs, in each motor control cycle, a previous voltage correction Vα*(n−1) to the q-axis feedback controller 362; the previous voltage correction Vα*(n−1) was a value of the voltage correction Vα* calculated by the execution determiner 357 at the previous motor control cycle (n−1) relative to the corresponding present motor control cycle.

The first voltage corrector 163 corrects the first q-axis voltage command Vq1* in accordance with the first voltage correction Vα1* in each motor control cycle to thereby calculate a corrected first q-axis voltage command Vq1**.

The second voltage corrector 263 corrects the second q-axis voltage command Vq2* in accordance with the second voltage correction Vα2* in each motor control cycle to thereby calculate a corrected second q-axis voltage command Vq2**.

The electric power steering system 8B configured set forth above achieves the advantageous effects that are identical to the advantageous effects achieved by the electric power steering system 8.

In particular, the motor control apparatus 3 includes the execution determiner 357, which is commonly provided for the first and second motor systems.

The execution determiner 357 determines, in each motor control cycle, whether to execute correction of the first and second q-axis voltage commands Vq1* and Vq2* in accordance with (1) The at least one of the motor angular velocity ω and motor angular acceleration ωdot
(2) The q-axis current sum Iq_s
(3) The q-axis current command Iq_s*

This enables whether execution of the voltage correction task is required to be properly determined in accordance with the sum of the first and second q-axis currents Iq1 and Iq2.

The q-axis feedback controllers 362 calculates the first q-axis voltage command Vq1* and the second q-axis voltage command Vq2* based on the q-axis current sum Iq_s. The previous voltage correction outputting unit 358 outputs, in each motor control cycle, the previous voltage correction Vα*(n−1), which is the sum of the sum of the first and second previous voltage correction Vα1*(n−1) and Vα2*(n−1), to the q-axis feedback controller 362.

This configuration therefore enables the first q-axis voltage command Vq1* and the second q-axis voltage command Vq2* to be calculated based on the sum of the first and second q-axis currents Iq1 and Iq2 suitably for the respective first and second motor systems.

Fourth Embodiment

Figure 13:
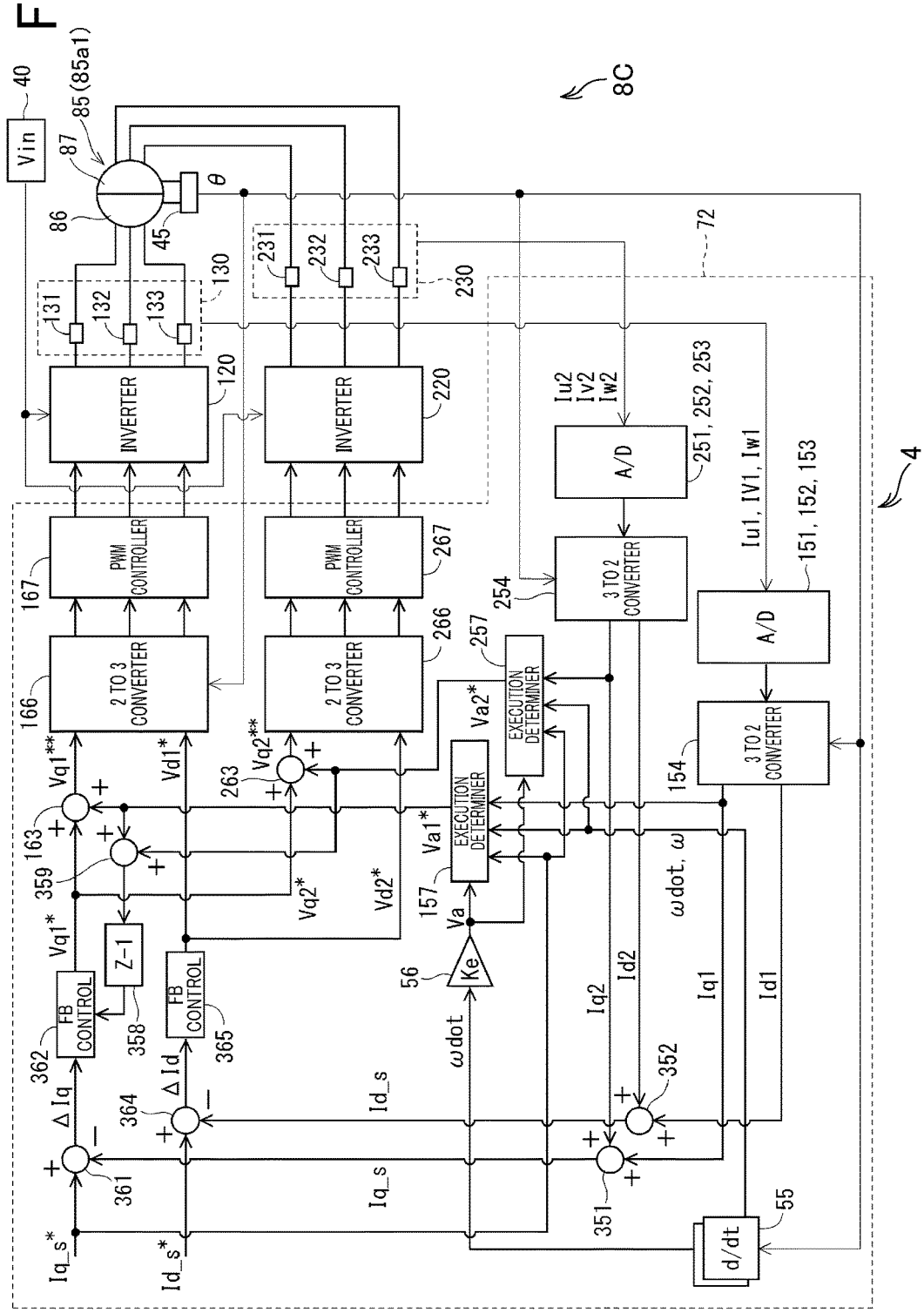
FIG. 13 is a block diagram schematically illustrating functional modules of a controller of a motor control apparatus according to the fourth embodiment of the present disclosure.

Next, the following describes the fourth embodiment of the present disclosure with reference to FIG. 13. The fourth embodiment differs from the third embodiment in the following points. So, the following mainly describes the different points, and omits or simplifies descriptions of like parts between the third and fourth embodiments, to which identical or like reference characters are assigned, thus eliminating redundant description.

An electric power steering system 8C includes the motor 85 and a motor control apparatus 4.

The motor control apparatus 4 includes the power-supply input circuit 10, the first inverter 120 for driving of the first coil set 86, the second inverter 220 for driving of the second coil set 87, the first current measuring unit 130, the second current measuring unit 230, the voltage monitor 40, the rotational angle sensor 45, the temperature detector 47, and a controller 72.

Referring to FIG. 13, the controller 72 includes the first A/D converters 151 to 153, the second A/D converters 251 to 253, the first and second three-phase to two-phase converters 154 and 254, the differential calculator 55, the fundamental voltage correction calculator 56, the first execution determiner 157, the second execution determiner 257, and the previous voltage correction outputting unit 358. The controller 72 also includes the current command calculator 60 (unillustrated in FIG. 13), the q-axis current adder 351, the d-axis current adder 352, the voltage correction adder 359, the q-axis subtractor 361, the q-axis feedback controllers 362, first and second voltage correctors 163 and 263, the d-axis subtractor 364, the d-axis feedback controller 365, the first and second two-phase to three-phase converters 166 and 266, and the first and second PWM controllers 167 and 267.

The motor control apparatus 4 according to the fourth embodiment is specifically configured to control the sum of the first and second d-axis currents Id1 and Id2, the sum of the first and second q-axis currents Iq1 and Iq2, the sum of the first and second d-axis current commands Id* and Id*, and the sum of the first and second q-axis current commands Iq1* and Iq2*, which is identical to the third embodiment.

In particular, the first and second execution determiners 157 and 257 are provided for the respective first and second motor systems, which is identical to the second embodiment. That is, the first and second execution determiners 157 and 257 respectively calculates the first and second voltage corrections Vα1* and Vα2* for the first and second motor systems.

The voltage correction adder 359 calculates, in each motor control cycle, the sum of the first and second voltage corrections Vα1* and Vα2* to calculate the voltage correction Vα*, thus outputting the voltage correction Vα* to the previous voltage correction outputting unit 358.

The previous voltage correction outputting unit 358 outputs, in each motor control cycle, the previous voltage correction Vα*(n−1) to the q-axis feedback controller 362; the previous voltage correction Vα*(n−1) was a value of the voltage correction Vα* calculated by the execution determiner 357 at the previous motor control cycle (n−1) relative to the corresponding present motor control cycle.

The electric power steering system 8C configured set forth above achieves the advantageous effects that are identical to the advantageous effects achieved by the electric power steering system 8B.

Modifications

The present disclosure is not limited to the above described embodiments, and can be variably modified within the scope of the present disclosure.

Each of the controllers 50, 70, 71, and 72 according to the first to fourth embodiments is configured to perform the voltage correction task for the q-axis voltage command, but can perform the voltage correction task for the duty factors for the respective switching elements 21 to 26, or perform the voltage correction task for another axis voltage command, such as the d-axis voltage command.

Each of the controllers 50, 70, 71, and 72 according to the first to fourth embodiments is configured to performs the PI feedback operation to thereby calculate a voltage command, but can perform another feedback operation, such as a proportional-integral-derivative (PID) feedback operation in a PID feedback control algorithm or a proportional feedback operation in a proportional feedback algorithm.

Each of the electric power steering systems 8, 8A, 8B, and 8C includes a single motor system, or two (first and second) motor systems, but can include three or more motor systems.

Each of the first to fourth embodiments is applied to a corresponding one of the electric power steering systems 8 to 8C, but can be applied to another system except for such an electric power steering system.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus for controlling a motor including at least one coil, the apparatus comprising:
a power converter including at least one switching element and configured to convert input power to output power via the at least one switching element, and apply the output power to the motor;
a motor current detector configured to detect a value of a motor current parameter associated with a current flowing in the at least one coil of the motor;
a rotational angle measuring unit configured to measure a rotational angle of the motor; and
a controller configured to control switching operations of the at least one switching element to thereby control drive of the motor,
the controller comprising:
a voltage command calculator configured to calculate, based on the value of the motor current parameter and a predetermined current command, a voltage command for the motor for each of sequential first and second motor control cycles;
a fundamental voltage command calculator configured to calculate, based on an angular acceleration of the motor associated with the rotational angle of the motor, a fundamental voltage correction for the voltage command for each of the first and second motor control cycles;
an execution determiner configured to:
determine, for each of the first and second motor control cycles, whether to execute a voltage correction task for the voltage command; and
obtain, for each of the first and second motor control cycles, a voltage correction as a function of:
the fundamental voltage correction; and
a result of the determination of whether to execute the voltage correction task for the voltage command;
a voltage corrector configured to correct, for each of the first and second motor control cycles, the voltage command based on the voltage correction; and
a correction voltage feedback unit configured to feed back a value of the voltage correction calculated at the first motor control cycle to the voltage command calculator,
the voltage command calculator being configured to calculate a value of the voltage command for the second motor control cycle based on the value of the voltage correction fed back from the correction voltage feedback unit in addition to the value of the motor current parameter and the predetermined current command.

2. The apparatus according to claim 1, wherein:
the execution determiner is configured to determine, for each of the first and second motor control cycles, whether to execute the voltage correction task for the voltage command in accordance with at least one of the current command and the value of the motor current parameter.

3. The apparatus according to claim 1, wherein:
the execution determiner is configured to determine, for each of the first and second motor control cycles, whether to execute the voltage correction task for the voltage command in accordance with a difference between the current command and the value of the motor current parameter.

4. The apparatus according to claim 1, wherein:
the execution determiner is configured to determine, for each of the first and second motor control cycles, whether to execute the voltage correction task for the voltage command in accordance with information based on a rotational speed of the motor.

5. The apparatus according to claim 1, wherein:
the execution determiner is configured to:
determine, for each of the first and second motor control cycles, a value of a correction execution gain depending on the result of the determination of whether to execute the voltage correction task for the voltage command;

calculate, for each of the first and second motor control cycles, the voltage correction as a function of the fundamental voltage correction and the value of the correction execution gain; and output, for each of the first and second motor control cycles, the voltage correction to the voltage corrector.

6. The apparatus according to claim 1, wherein:
the controller is configured to limit a predetermined frequency range of the voltage correction using a filter, thus obtaining the voltage correction whose predetermined frequency range has been limited; and
the correction voltage feedback unit is configured to feed back a value of the voltage correction whose predetermined frequency range has been limited to the voltage command calculator.

7. The apparatus according to claim 1, wherein:
the at least one coil comprises a first coil and a second coil;
the power converter comprises a first power converter and a second power converter provided for the respective first and second coils.

8. The apparatus according to claim 7, wherein:
the first coil and the first power converter constitute a first motor system, and the second coil and the second power converter constitute a second motor system;
the execution determiner comprises a first execution determiner provided for the first motor system, and a second execution determiner provided for the second motor system; and
each of the first and second determiners is configured to determine, for each of the first and second motor control cycles, whether to execute the voltage correction task for the voltage command in accordance with at least one of:
  information based on a rotational speed of the motor in the corresponding one of the first and second motor systems;
  the current command for the corresponding one of the first and second motor systems; and
  the value of the motor current parameter for the corresponding one of the first and second motor systems.

9. The apparatus according to claim 7, wherein:
the first coil and the first power converter constitute a first motor system, and the second coil and the second power converter constitute a second motor system; and
the execution determiner is configured to determine, for each of the first and second motor control cycles, whether to execute the voltage correction task for the voltage command in accordance with at least one of:
  information based on a rotational speed of the motor in the corresponding one of the first and second motor systems;
  the sum of a first value of the motor current parameter for the first motor system and a second value of the motor current parameter for the second motor system; and
  a value of the current command for the sum of the first and second values of the motor control parameter.

10. The apparatus according to claim 8, wherein:
the voltage command calculator comprises first and second voltage command calculators provided for the respective first and second motor systems; and
the correction voltage feedback unit is configured to:
  feed back a first value of the voltage correction calculated at the first motor control cycle for the first motor system to the first voltage command calculator; and
  feed back a second value of the voltage correction calculated at the first motor control cycle for the second motor system to the second voltage command calculator.

11. The apparatus according to claim 9, wherein:
the voltage command calculator comprises first and second voltage command calculators provided for the respective first and second motor systems; and
the correction voltage feedback unit is configured to:
  feed back a first value of the voltage correction calculated at the first motor control cycle for the first motor system to the first voltage command calculator; and
  feed back a second value of the voltage correction calculated at the first motor control cycle for the second motor system to the second voltage command calculator.

12. The apparatus according to claim 8, wherein:
the voltage command calculator is configured to calculate, for each of the first and second motor control cycles, the sum of the first value of the first motor control parameter for the first motor system and the second value of the second motor control parameter for the second motor system; and
the correction voltage feedback unit is configured to feed back, to the voltage command calculator, a value of the sum of:
  a first value of the voltage correction calculated at the first motor control cycle for the first motor system; and
  a second value of the voltage correction calculated at the first motor control cycle for the second motor system.

13. The apparatus according to claim 9, wherein:
the voltage command calculator is configured to calculate, for each of the first and second motor control cycles, the sum of the first value of the first motor control parameter for the first motor system and the second value of the second motor control parameter for the second motor system; and
the correction voltage feedback unit is configured to feed back, to the voltage command calculator, a value of the sum of:
  a first value of the voltage correction calculated at the first motor control cycle for the first motor system; and
  a second value of the voltage correction calculated at the first motor control cycle for the second motor system.

14. The apparatus according to claim 1, wherein:
the execution determiner is configured to set a range of the voltage correction to be equal to or higher than a predetermined lower limit guard level and equal to or lower than a predetermined higher limit guard level.

15. The apparatus according to claim 1, further comprising:
a temperature detector configured to detect an internal temperature of the apparatus,
wherein the execution determiner is configured to change the voltage correction depending on the detected internal temperature.

16. An electric power steering system comprising:
a motor configured to output assist torque for assisting a driver's turning operation of a steering member of a vehicle;
an apparatus for controlling the motor according to claim 1; and
a transfer mechanism configured to transfer the assist torque to a target member linked to the steering member.

* * * * *